United States Patent
Foroughi et al.

(10) Patent No.: US 11,810,469 B2
(45) Date of Patent: Nov. 7, 2023

(54) JUST-IN-TIME TRAINING SYSTEM AND METHOD

(71) Applicant: 1230604 BC Ltd., Toronto (CA)

(72) Inventors: Ehsan Foroughi, Toronto (CA); Houssam Haidar, Toronto (CA); Calvin Lo, Milton (CA); Lauren Park, Toronto (CA); Rohit Kumar Sethi, Toronto (CA); Emin Tham, Surrey (CA); Geoffrey Charles Whittington, Waterloo (CA)

(73) Assignee: SECURITY COMPASS TECHNOLOGIES LTD., Toronto (CA)

( * ) Notice: Subject to any disclaimer, the term of this patent is extended or adjusted under 35 U.S.C. 154(b) by 0 days.

(21) Appl. No.: 17/512,466

(22) Filed: Oct. 27, 2021

(65) Prior Publication Data

US 2022/0130272 A1    Apr. 28, 2022

Related U.S. Application Data

(60) Provisional application No. 63/105,920, filed on Oct. 27, 2020.

(51) Int. Cl.
*G09B 19/00* (2006.01)
*G09B 7/00* (2006.01)
(Continued)

(52) U.S. Cl.
CPC .............. *G09B 19/00* (2013.01); *G09B 7/00* (2013.01); *G06Q 10/06398* (2013.01);
(Continued)

(58) Field of Classification Search
CPC . G09B 19/00; G09B 5/00; G09B 7/00; G06Q 10/063112; G06Q 10/06398; G06Q 50/20
See application file for complete search history.

(56) References Cited

U.S. PATENT DOCUMENTS 6,157,808 A * 12/2000 Hollingsworth ......... G09B 7/02
                                                                434/350
8,533,658 B2    9/2013 Patten et al.
(Continued)

OTHER PUBLICATIONS

Ley, Tobias, et al. "Modeling competencies for supporting work-integrated learning in knowledge work." Journal of knowledge management (2008).
(Continued)

*Primary Examiner* — Jack Yip

(57) ABSTRACT

An electronic just-in-time learning and training system that is integrated into a user workflow to provide users with the knowledge they require to complete the tasks in the workflow and to provide meaningful and impactful training to users or advancement along a learning or training path. User tasks are matched to training modules in a training database to assist with completion of a task while a user profile tracks user training to deliver the most appropriate training modules. The system tracks completion of training modules to guide the user with training and advancement and to offer the user opportunities for additional certification and learning.

18 Claims, 13 Drawing Sheets

(51) Int. Cl.
  *G06Q 50/20* (2012.01)
  *G06Q 10/0631* (2023.01)
  *G06Q 10/0639* (2023.01)
  *G09B 5/00* (2006.01)

(52) U.S. Cl.
  CPC ..... *G06Q 10/063112* (2013.01); *G06Q 50/20* (2013.01); *G09B 5/00* (2013.01)

(56) References Cited

U.S. PATENT DOCUMENTS

| | | | |
|---|---|---|---|
| 9,852,382 B2 | 12/2017 | Rangaswamy et al. | |
| 9,905,136 B2 | 2/2018 | Kapoor | |
| 10,042,636 B1 | 8/2018 | Srivastava et al. | |
| 10,127,831 B2 | 11/2018 | Cohen et al. | |
| 10,424,212 B2 | 9/2019 | Wexler | |
| 10,490,096 B2 | 11/2019 | Sorenson et al. | |
| 10,514,998 B2 | 12/2019 | Klein | |
| 10,740,469 B2 | 8/2020 | Zheng et al. | |
| 11,113,987 B1* | 9/2021 | Jaggers | G09B 5/04 |
| 2001/0011280 A1* | 8/2001 | Gilbert | G06Q 10/10 715/255 |
| 2003/0182173 A1* | 9/2003 | D'Elena | G06Q 10/06375 705/7.14 |
| 2006/0172275 A1* | 8/2006 | Cohen | G09B 7/00 434/350 |
| 2007/0203713 A1* | 8/2007 | Habichler | G06Q 10/00 705/320 |
| 2009/0276231 A1* | 11/2009 | Bazigos | G09B 7/00 705/320 |
| 2010/0233663 A1* | 9/2010 | Pennington | G09B 19/00 434/219 |
| 2013/0171594 A1* | 7/2013 | Gorman | G09B 5/00 434/219 |
| 2013/0311416 A1* | 11/2013 | Liu | G06Q 10/06 706/46 |
| 2014/0242565 A1* | 8/2014 | Abts | G09B 5/00 434/350 |
| 2015/0120593 A1* | 4/2015 | Madhavan | G06Q 10/1053 705/321 |
| 2016/0093232 A1* | 3/2016 | Chong | G06F 8/436 434/118 |
| 2017/0068922 A1* | 3/2017 | Singh | G06F 3/0481 |
| 2018/0374059 A1 | 12/2018 | Kapoor | |
| 2020/0090127 A1 | 3/2020 | Masood et al. | |

OTHER PUBLICATIONS

Rostanin, Oleg, and Harald Holz. "Task-Embedded e-Learning." Url: http://137.251 109 (2005).

Rostanin, Oleg, et al. "Project TEAL: Add adaptive e-learning to your workflows." Proceedings: I-KNOW. vol. 6. 2006.

Zur Muehlen, Michael. "Resource modeling in workflow applications." Proceedings of the 1999 Workflow Management Conference. vol. 70. 1999.

* cited by examiner

Q Java password

Videos

- ▶ Authorization in Java using Apache Shiro
- ▶ Defending against cookie hijacking in Java
- ▶ Server-side session management in Java
- ▶ Defend against SQL injection in Java
- ▶ XML entity attacks in Java
- ▶ Race conditions in Java web applications
- ▶ Java file inclusion attack
- ▶ Securely storing passwords How Tos

- ≡ Java EE
- ≡ Using Correct Cryptographic Algorithms and Parameters in Java
- ≡ Java or Android Keystore
- ≡ Java with Jasypt
- ≡ Java EE: Enforcing Minimum Password Requirements
- ≡ Java with Jasypt: Protect passwords in property and configuration files
- ≡ Java EE with AppSensor
- ≡ Java with ESAPI and Jasypt: Use standard libraries for encryption

Figure 15

Micro training Modules

- ▶ JSON Validation — 1:15
- ▶ Cross Site Request Forgery (CSRF) — 0:50
- ▶ OAuth Authentication — 2:32

˅ Show more

Micro training Articles

- ≡ Django: Enable SecurityMiddleware — 3 min
- ≡ Protecting Node.js against CSRF — 2 min
- ≡ WCF - Use of local issuer — 5 min

Figure 16

JUST-IN-TIME TRAINING SYSTEM AND METHOD

CROSS-REFERENCE TO RELATED APPLICATIONS

This application claims priority to United States provisional patent application U.S. 63/105,920 filed 27 Oct. 2020, which is hereby incorporated by reference herein in its entirety.

FIELD OF THE INVENTION

The present invention pertains to an electronic learning and training system method and system for matching training to one or more work orders or tasks that a user is required to do as part of a work assignment. The present system and method provides for in-context and timely delivery of relevant training material that users need to know to best perform a job or is of assistance in performing a work task.

BACKGROUND

Training techniques and methods are changing and adapting to our new technological age. Early studies by Hermann Ebbinghaus on the amount of material that learners are able to remember, known as the "forgetting curve," showed that within one hour people forgot an average of fifty percent of the information presented. Within twenty-four hours, learners have forgotten an average of seventy percent of new information, and within a week an average of ninety percent of what was learned is lost from the human mind. Recent studies have suggested that the average attention span of humans is shortening and traditional training and learning methods need to adapt to the new skills and time restrictions of a modern learning environment and workplace. Individuals are used to consuming information when and where they want it, and this information consumption pattern has spilled over from people's personal lives into their professional activities. As a result, employees have an expectation that they will consume work-related training as they want and need it. While learners want information where and when they need it, there are limitations on what learners can consume and remember.

As stated in the World Economic Forum's January 2016 report, "[a]s business leaders begin to consider proactive adaptation to a new talent landscape, they need to manage skills disruption as an urgent concern. They must understand that talent is no longer a long-term issue that can be solved with tried and tested approaches that were successful in the past or by instantly replacing existing workers. Instead, as the rate of skills change accelerates across both old and new roles in all industries, proactive and innovative skill-building and talent management is an urgent issue." ('The Future of Jobs—Global Challenge Insight Report', World Economic Forum, January 2016) What is required are workplaces that employ "new kinds of analytical tools to spot talent trends and skills gaps, and provides insights that can help organizations align their business, innovation and talent management strategies to maximize available opportunities to capitalize on transformational trends."

High-impact learning organizations can be graded on learning organization maturity, which refers to the ability of the organization to anticipate the learning needs of employees and provide appropriate and timely learning opportunities. Organizations that achieve learning organization maturity intentionally stage learning and training content, provide support in advance of worker need, and limit work interruptions such that employees are never or rarely lifted out of work exclusively for the purpose of learning or training. Organizations that effectively support employee learning and training provide development opportunities that arise on a regular basis and are able to incorporate and support learning as a part of the regular flow of work. According to a recent study by LinkedIn, 48% of those who responded to their survey preferred to learn at the time they needed the information, and 68% of those who responded preferred to learn at work. (2018 Workplace Learning Report: The Rise and Responsibility of Talent Development in the New Labor Market," LinkedIn, 2018, https://learning.linkedin.com/resources/workplace-learning-report-2018) To create a culture of learning and develop high performing workplaces, organizations must understand the workflow of their employees and teams and provide training when and each individual employees needs it. Employee workflow allocation in conjunction with appropriately timed training that is directly related to the workflow assists in ensuring that employee knowledge is up to date, complete, and relevant to the immediate tasks required to be done.

In one example of an electronic learning system, U.S. Pat. No. 9,905,136 to Kapoor describes a learning system and database of activity items generated as users perform actions on the learning system. The learning system verifies a user's role and activity items to generate a user learning history.

Modern workplaces regularly use electronic and online project and task tracking software to breakdown project components and assist workers with planning required tasks and timelines. These types of systems are especially prevalent in software development where software projects are segmented into individuals tasks to be done, and each segment or set of segments is assembled or addressed by a different developer or team of developers. Other industries are adopting similar workflow management systems to non-software development projects to assist with project tracking, project planning, and team organization.

In an example of workflow allocation, U.S. Pat. No. 9,852,382 to Rangaswamy et al. describes a system and method for dynamic human workflow task assignment using business rules to determine human task routing patterns and participants in human tasks. Human tasks are integrated into the workflow task in the process and the integration of rules into human workflow can be performed using service component architecture so that rules engines can be plugged-in as required.

There exist other examples of Learner Interaction Monitoring Systems (LIMS) such as that described in U.S. Pat. No. 10,490,096 to Sorensen et al. which describes evaluating user behavior relating to a course of study by collecting real-time data on learner behavior in self-directed online learning environments and interpreting this data by drawing on behavioral research.

With regard to designing security into software applications, in one example, the evolution of technology gives rise to new and unknown cybersecurity risks and threats. To protect against these risks, organizations need software developers to be able to learn and have knowledge of the most recent and best security practices so that they can build robust and secure software systems. However, keeping up to date on new security concepts and best practices while managing tight software delivery timelines can pose a challenge to developers, software teams, and managers. Lack of knowledge or inability to remember what needs to be applied to create secure code can result in a costly re-coding exercise and security risk.

There remains a need for an electronic learning and training system that is integrated into the workflow of a user to provide users with the knowledge they require to complete tasks in the workflow and to provide meaningful and impactful just-in-time training to users.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an electronic training system that is integrated into the workflow of a user to provide users with the knowledge they require to complete the tasks in the workflow and to provide meaningful and impactful timely training to users. Another object of the present invention is to provide a system for in-context and on-time delivery of relevant microlearning and training material that users need to know to best perform their jobs at work or advance in their learning and training by matching the learning or training to one or more work orders or tasks that a user is required to do as part of a work assignment or advancement along a learning path and tracking the user training in a user profile.

In an aspect there is provided a method of providing just-in-time training, the method comprising: storing user information in an electronic user profile comprising a user's training record along a learning path in a work environment and data on the user's skill proficiency across a variety of work-related skills; assigning one or more work tasks to a user selected from an electronic work task database, each work task comprising a technical description of the work task and a set of requirements for completing the work task matching the identified work tasks to one or more training module in a training module database by comparing contextual identifiers associated with the training module comprising one or more keyword, code fragment, or metadata tag, to the technical description or the set of requirements for the work task; automatically selecting one or more relevant training modules from the matched one or more training modules based on the user's training record by prioritizing training modules that are on the user's learning path and not already completed by the user; in a user graphical user interface, embedding the one or more relevant training modules with the work task and directing to the user to the relevant training modules without interrupting user workflow while completing the work task; and automatically updating the user training record to indicate user completion of the relevant training modules and automatically updating the user profile to indicate completion of the allocated work task.

In another aspect there is provided a method of providing just-in-time training, the method comprising: identifying a work task for a user, the work task comprising task context; matching the work task to at least one training module in a training database, the training database comprising a plurality of training modules, each of the training modules comprising at least one contextual identifier to match the training module to the work task based on the task context; evaluating whether the matched training module is relevant to a particular user based on a user profile; providing one or more relevant training modules to the user; and tracking completion of the relevant training modules by the user in the user profile.

In an embodiment, the method further comprises generating an electronic project in the work environment comprising a plurality of work tasks required for completing the project; and automatically allocating, in an application lifecycle management (ALM) tool, one or more user work tasks to the user from the plurality of work tasks in the project, the user work tasks allocated based on the user's training record and skill proficiency.

In another embodiment, the method further comprises identifying a work task for a user comprises selecting a work task from a task database and assigning the work task to the user.

In another embodiment, the method further comprises creating a new work task, analysing the task context of the task, and matching the new work task to at least one training module in the training database based on the task context.

In another embodiment, the method further comprises presenting the user with additional training modules upon completion of which would result in a training course certification.

In another embodiment, each training module comprises one or more of text, slideshow, video, audio, games, puzzle, virtual reality simulation, augmented reality, mini-task, quiz, external link, and interactive media.

In another embodiment, the training module is customizable.

In another embodiment, completion of the training module takes less than ten minutes.

In another embodiment, the user is prevented from starting a particular task on the task list before completion of the training module associated with that task.

In another embodiment, the method further comprises grouping multiple training modules into a training course and certifying completion of the training course when the user has completed all of the training modules in the training course.

In another embodiment, at least one training module has a schedule for refreshing, the method further comprising tracking the user completion date, and putting a training module on the training task list when the training module needs to be refreshed by the user.

In another embodiment, the method further comprises classifying each task and user by level of expertise and work tasks are identified for the user based on user expertise.

In another embodiment, the method further comprises tracking performance of a user and suggesting a training module to a user when the performance of the user would benefit from the training module.

In another embodiment, the user is automatically assigned to a task or excluded from executing a task based on their user profile.

In another embodiment, the method further comprises regularly updating one or more work tasks and learning modules.

In another embodiment, the work task is matched to a training module by textual code analysis of code by a code analysis engine and the textual code analysis result is matched to a contextual identifier in the training module.

In another embodiment, the method further comprises quantifying a work product of the work task to indicate the user's skill proficiency at the work task and updating the user profile to upgrade, downgrade, or affirm the user's skill proficiency.

In another aspect there is provided a computerized training system comprising: a training database comprising a plurality of training modules, each of the training modules comprising at least one contextual identifier to match the training module to the work task based on the task context; a user work task list comprising a selection of work tasks for completion the user; a user training module list comprising a selection of training modules selected from the training database, the selection of training modules associated with the selection of work tasks; and a user profile storing data regarding the training modules completed by a user.

In an embodiment, the system further comprises a task database, wherein work tasks for the user work task list are selected from the task database.

In another aspect there is provided a method for timely delivery of contextually relevant training, the method comprising: establishing one or more work tasks for a user, each work task having at least one training module associate with the work task; if the training module has not already been completed by the user, delivering the training module to the user; tracking completion of the training module by the user in a user profile; and establishing a learning profile for the user based on the completion of training modules completed over time across multiple work tasks.

In another aspect there is provided a computerized training system comprising: a task database comprising a plurality of work tasks, each work task comprising a technical description of the work task and a set of requirements for completing the work task; a training database comprising a plurality of training modules, each of the training modules comprising contextual identifiers associated with the training module comprising one or more keyword, code fragment, or metadata tag, to the technical description or the set of requirements for the work task to match the training module to a work task based on the task context; a user profile database storing individual user information in an electronic user profile, the user information comprising a user's training record along a learning path in a work environment and data on the user's skill proficiency across a variety of work-related skills; and a graphical user interface displaying a work tasks assigned to a user selected from the task database and one or more training modules relevant to the work task that have been automatically selected for the user for the work task based on the user's training record.

In another aspect there is provided a computer-readable storage medium having one or more instructions thereon for providing just-in-time user training, the instructions when executed by a processor causing the processor to: identify a work task for a user, the work task comprising task context; match the work task to at least one training module in a training database, the training database comprising a plurality of training modules, each of the training modules comprising at least one contextual identifier to match the training module to the work task based on the task context; evaluate whether the matched training module is relevant to a particular user based on a user profile; provide one or more relevant training modules to the user; and track completion of the relevant training modules by the user in the user profile.

BRIEF DESCRIPTION OF THE FIGURES

For a better understanding of the present invention, as well as other aspects and further features thereof, reference is made to the following description which is to be used in conjunction with the accompanying drawings, where:

FIG. 5 illustrates an example graphical user interface showing a user work interface having a prioritized work task list;

FIG. 6 illustrates an example graphical user interface showing a work task with associated training modules grouped by training course;

FIG. 14 illustrates an example graphical user interface showing a work task with task requirements and associated training modules;

FIG. 15 illustrates an example graphical user interface showing an internal training module search in the training database; and FIG. 16 illustrates a section from a graphical user interface providing a list of task-specific training modules and training articles.

DETAILED DESCRIPTION OF THE INVENTION

Figure 1:
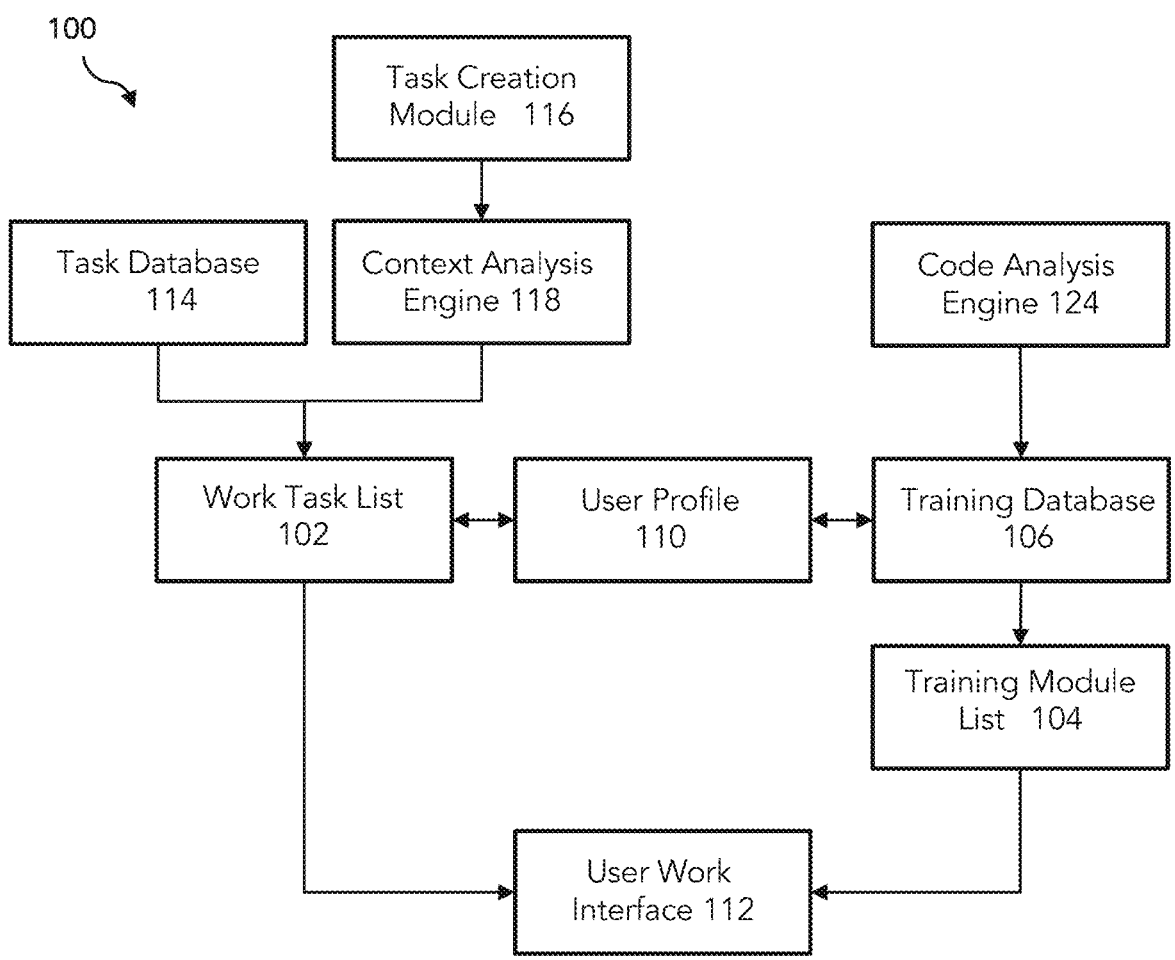
FIG. 1 is a block diagram of an example just-in-time training method.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "developer" as used herein refers to anyone involved in the development, maintenance, testing, and/or regulatory aspects of a software application at any point throughout the software application lifecycle. Non-limiting examples of developers include software developers, requirements analysts, programmers, testers, project leaders, auditors, regulatory advisors, and security analysts.

The term "user", as used herein refers to a person or individual employing the present system in a work environment. The user can be an employee of an organization, a worker, or a private individual. In some cases the user can be an individual who is doing work independent of an organization, such as a private citizen seeking to learn new skills and acquire knowledge while performing a task. In a preferred case the user is a member of an organization, such as an employee or contractor, who is tasked with work in the organization work environment.

The term "task" refers to any issue, job, work assignment, or requirement to be completed. The term "work order" is the assignment of a task to a user, person, worker, or employee.

The term "work task" is used herein to refer to a task required by or assigned in a work environment. The work task comprises a general description or title of the work to be done and a set of requirements for completing the work task. Although the present application describes and exemplifies work tasks in the task database as "work" related, it is understood that the same system can be used for tasks that are of a non-work nature, such as those relating to a learning or training path, or tasks that are related to a work order or task relating to employment.

The term "just-in-time" as used herein refers to a coordinated training and/or learning system whereby a training or learning module is suggested to or presented to a user which is relevant to an upcoming or current task or next learning step. As such, "just-in-time" refers to training or learning presented to a user at the moment when the training or learning is needed.

The terms "learning" and "training" are used interchangeably herein to refer to knowledge or information presented to a user regardless of intent of use. The learning and training can be related to a work activity, educational activity, trade, hobby, craft, general interest, scholastic activity, and includes any type of information or knowledge used for professional, personal, academic, or personal enrichment.

The term "task context" refers to any data pertaining to a task that describes or is associated with a technical or descriptive feature of the task. Task context can be inferred or extracted from a task description, which can include but is not limited to natural language description, task type, task difficulty, as well as technical description of the task, optionally including one or more software code fragments in the case of software development work tasks. Task context can be technical or non-technical and can include textual description of the task or its purpose in natural or plain language, and/or in software code. Task context can also comprise details on the project, department, role of the user to address the task, and other context to which the task belongs.

Herein is described an electronic learning and training system and method for providing training which is timed to coincide with a work order or task that a user is required to do as part of a work assignment. The present system and method provides for in-context and on-time delivery of relevant microlearning and training material that users need to know to best perform their job or tasks at work by matching training to one or more work orders or tasks that a user is required to do as part of a work assignment. In some cases the training modules are directed to best practices in the organization, however other essential training can be provided for workers to master to ensure safety, proper procedure, the achievement of certain standards, and desired workplace performance. Each training module incorporates at least the minimal amount of instruction or learning needed to complete an upcoming task or piece of an upcoming task, or next step of instruction or training along a learning path.

Using the present system and method, workers can learn on the job as they encounter new types of tasks alongside relevant learning and training opportunities that assist them with learning, training, and completion of work assignments. The system keeps track of completion of these training pieces in a user profile and training record and can provide further opportunities to users to complete other microtraining or microlearning segments as a part of training modules that may be completed ad hoc (out of the context of the job or work task) to achieve certification or completion of a group of learning or microlearning modules that form a training course. In this way workers can be awarded with certifications of completion of training courses by completing the course in microtraining segments while on the job and in a job-relevant manner.

Just-in-Time training takes training a step further from available knowledge libraries and traditional knowledge delivery methods, and delivers knowledge, training, and information exactly when and where it is needed, and at the point of friction where employees are likely to make mistakes. In contrast to regular training courses that offer many consecutive hours of training, usually in a classroom or in an online course, much of which may not be immediately relevant to the worker's current work, the presently described just-in-time training system offers timely and relevant training in an electronic format alongside required work tasks while enabling the user to complete the same course material and obtaining course certification in an on-the-job learning environment while completing the work relevant to the training. More importantly, the relevant and timely training offered by the present system facilitates training by teaching users exactly what they need to know to do their job at the time they require the knowledge, giving users workplace training at the same time as enhanced job performance guidance. As such, the described just-in-time training system and method provides workers with relevant training modules to learn or refresh their learning, where the training they are receiving is directly related to tasks that they are required to perform on the job. By matching work-related tasks with relevant training, users are able practice what they learn quickly after they learn it, which enhances performance as well as long-term learning.

The present invention provides a complementary and integrated online training system and method where tasks allocated to a user in a task management system are accompanied by relevant and useful microlearning training modules that enable the user to learn or refresh their learning and skills prior to or while they are addressing the task in a work order. Maintaining a training record in the user profile of training modules completed by the user allows the user to keep track of their learning, which modules they have completed, and set learning goals for themselves to improve their skills proficiency as well as achieve certifications, all in the course of task completion in a work environment.

Beyond providing the information at the time the learner needs it and conveniently linking training to a work task list or the work itself, just-in-time training also reinforces knowledge and helps learners to better perform their work. The present system and method accomplishes this by embedding learning and knowledge modules into work orders and business processes so that users are directed to relevant training and information without interrupting their workflow. Users can also receive the relevant training modules on their issue or work tracking systems where they can learn while completing their regular tasks, with training fully integrated into their work flow. Tracking user training in a user profile further enables work advancement on the job and provides opportunities for advancement through the completion of training courses.

Based on the work required by a user, the present method and system can provide tailored and relevant training material to complete the work for any particular project and/or industry. By providing up-to-date and just-in-time training and learning materials alongside the task required to be done, users, developers, and employees can have the confidence that they have the relevant skills to complete the task. Providing users with an in-context electronic learning (e-learning) mediated work environment enables people to learn material that is immediately relevant to the work they are doing at the same time as being productive in the workplace. Integration of learning or training with on-the-job practice in a useful way enables employees to learn more effectively as they work. The present system can also reduce anxiety and improve employee confidence by providing easy access to the knowledge users need when they need it as they are doing their job. Customizable training modules delivered to workers further enables an organization to direct users to complete tasks in a form that is consistent with organizational guidelines and objectives. This self-driven practise makes for more engaged learners, as the desire to execute and see the immediate results of the task propels workers to learn and execute to the best of their ability.

Although software development is used in the present description as a model of where the presently described just-in-time training system and method can be used, it is understood that the same or similar system can be used in other industries, including but not limited to information technology, pharmaceutical, legal, medical, construction, marketing, trades, computer aided design (CAD), accounting, system operation, as well as online education systems.

FIG. 1 is a block diagram of an example computer-enabled just-in-time training method which delivers relevant training complementary to a workflow. The just-in-time training system 100 shown identifies work being done by a user, and in combination with the user profile 110 keeps track of training completion and recommends training to the user based on their user profile 110 as well as the task they are currently working on. A user work task list 102 is allocated to a user and added to a user's electronic issue tracker, to-do list, or similar work task list. The work task list 102 can be assembled, for example, by the user, a manager, or by a team of users working on a project. Each task that a user is working on can be matched with one or more relevant training modules in a few different ways. In one way, one or more of the work tasks on the work task list can be selected from a list of tasks in a task database 114, where the tasks in the task database are already mapped to particular training modules in a training database 106. In organizations where the same or similar tasks are required for a plurality of projects, such as in a software development environment, a task database 114 can comprise pre-assembled tasks with pre-mapped relevant training modules. Alternatively, a new work task that is not already in the task database 114 can be can be created, such as in a task creation module 116, and relevant training modules can be recommended based on the task context of the task.

In a newly created task or for a task that is not already matched to at least one training module, a context analysis engine 118 can analyse the contents of the task to identify the task context, and use the identified task context to match relevant training modules. When the system scans a task, such as a work instruction or job description, it searches through the task context and identifies and combines the identified words and/or strings of characters into one or more task descriptions, context identifiers, or keywords. The task context can include but is not limited to natural language descriptions, keywords, code fragments, or identifiers which can be identified and matched with training modules that have already been identified as relevant to the identified task context. From the task description can be extracted one or more contextual identifiers, also referred to as keywords or metadata tags, which are based on the task description and/or other contextual data such as code fragments, associated with the task.

The contextual identifier can also be crafted from the words or from the other details in the work and/or environment. In particular, other aspects of the task context or work description can also be considered in the identification of context identifiers for the task, such as, for example the department the task is assigned from (e.g. Quality Assurance, Operations, DevOps, Software Development, Product Development, Support), the user role in a project (e.g. developer, human resources, manager) the affected assets (e.g. database, real world object), specific project information and type of project to which the task is related (e.g. backend security, website design, testing), and the asset details (e.g. database name, object name). In one example, the task context or task description can be short because the user in the department where the task originates may already understand the context, purpose, and scope of the task without additional textual description. In this case, other aspects of the task context, such as for example the department from which the task has been assigned, can be used as part of the task context to isolate context identifiers from the task. Specific training modules which have been matched to each task are then recommended for each particular user based further on the user profile such that the most relevant training tasks for any given task are presented to the user.

In one example of a matching system that matches a task to one or more training module, consider a training database having M training modules:

{t1, t2, . . . , tM; M>0}

For example, a training module database (TMd) with three training modules could be represented as a JSON-formatted list:

[ {"title": "Java Development Training", "link": "http://train/java"},
{"title": "Mobile Development Training", "link": "http://train/mobile"},
{"title": "Access databases using Java Training", "link": "http://train/database_java"} ]

Contextual identifiers in the training modules and tasks can be matched by tracking and comparing them in a keyword database. In one example, the system tracks contextual identifiers or keywords in a keyword database (KWd) having N keywords or strings of characters:

{k1, k2, . . . , kN; N>0}

For example, a keyword database having five keywords can be represented as a JSON-formatted list as follows:

["java", "api", "mobile application", "web service", "postgres"]

The system can then associate one or more keywords from the keyword database KWd with each training module from the training module database TMd. For example:

[ {"title": "Java Development Training", "link": "http://train/java", "keywords": ["java"]},
{"title": "Mobile Development Training", "link": "http://train/mobile", "keywords": ["mobile application"]},
{"title": "Access databases using Java Training", "link": "http://train/database_java", "keywords": ["postgres", "java"]} ]

For every training module from TMd, the system can then examine the list of its identified associated keywords. If many or all of the keywords for a particular training module are found in the work description of the task or task context thereof, then the training module is considered relevant to the task. The same methodology of context identification can be used for the training modules to identify contextual identifiers that are particular to the training module such that the same or similar contextual identifiers from the task and training modules can be matched.

In another alternative in a software development environment, a user may be coding and the system can analyse the code to identify relevant training modules in the training database 106 that are relevant to the code that the developer is working on. One example of where code can be analysed from by the code analysis engine 124 is in an Integrated Development Environment (IDE), which is widely used in software development and normally consists of at least a source code editor or text editor, build automation tools, and a debugger. Textual code analysis of the working code in the IDE at a code analysis engine 124 can identify a code fragment that a user is working on and recommend a relevant training module based on the code fragment. The code analysis engine 124 can scan code from the source code editor in the IDE to identify code segments that can be matched to keywords or tags in one or more training modules in the training database 106. Relevant training modules can then be offered to the user based on a match to the relevant training and in combination with the user profile which identifies which training the user has and has not completed. Recommendations of training modules can also be provided to the user based on a combination of code analysis and user-provided goals in the user profile. Using code scanning in the IDE can effectively identify the task that a developer is working on without referring to a work issue tracker or task list. In this way, relevant training can be provided to the developer based on the code in progress and the user profile 110. The code scanning by the code analysis engine can be done either during active coding at the IDE or at a review stage, such when the developer has pushed the code changes to a central code repository for other developers to review the changes. At the code review stage the code analysis engine 124 can be engaged to scan the list of code changes and examine only the changes versus the IDE. Training material can then be recommended or suggested to the user based on the whole code file or only the code changes, and provided to the user based on the primary code developer's code as well as their user profile 110.

Each task in the user work task list 102 which is matched to one or more training modules is compared against the user profile 110 so that the identified relevant training modules in the training database 106 are appropriate for the user. In one example, if the user is less experienced, then beginner training modules are brought forward in the training module list 104. If the user is more advanced, then the user profile 110 will indicate that the beginner training modules have already been completed by the user and may provide more advanced training modules for training advancement. For the more advanced user, links to the beginner training modules can still be provided to enable the user to look back at training they have already completed for reminder or reinforcement of learning. Each task on the work task list 102 is thereby matched to one or more relevant training modules in a training module list 104, where the training tasks are either essential or useful knowledge for completing the work tasks on the work task list 102 and the training module is relevant to the particular user as determined by the use profile 110.

The set of training modules which form the training module list 104 are taken from a training database 106, which is a library comprising microlearning and training modules, optionally and preferably organized or grouped into training courses. Each microlearning or training module in the training database 106 comprises training or learning material and is brought into the training module list 104 for a user if it is linked to or associated with a user task in the work task list 102 and deemed relevant based on the user profile. To satisfy the learning and training requirements of the learner or user of the system, training modules or links thereto are preferably provided in microlearning style fragments from the training database 106 to the user work interface 112 just when the learner needs it, or just when they are about to or working on a task in a work task list 102. Microlearning is a training method that delivers content in small, bite-sized pieces of information to learners. In microlearning, relatively small learning units and short-term learning activities are provided to learners, with short-term-focused strategies especially designed for skill based understanding, learning, and education. Repetition or reminders of learning as well as providing learners with information when they need it broken down into bite-sized or microlearning-sized pieces that can be remembered can improve learning and retention. Some benefits of microlearning can also include better engagement for learners, better retention of concepts, better transfer to the job of the concepts learned, and benefit for the organization in terms of faster and more efficient project advancement.

A user work interface 112 can provide tasks to the user from the work task list and training module list 104 and can be displayed on a display such as a graphical user interface on a screen or electronic device. The user work interface 112 can be any type of interactive electronic device having a screen and user interface, including but not limited to a computer, laptop, tablet, mobile device, augmented reality (AR) system, virtual reality (VR) system, or smartphone. The present system and method can also be integrated into a variety of work management systems and application lifecycle management (ALM) tools which provide a work ticketing system to describe and prioritize work. These include but are not limited to Slack™, Jira™, Salesforce™, Google™ products such as Drive Teams and Drive, Dropbox™, Adobe™ products such as Experience Manager and Creative Cloud, GitHub™, and Microsoft™ products such as Teams and One Drive. In one embodiment, the work task list 102 can also be exported as a single list or document or ALM tool, such as Atlassian JIRA™. In an ALM, the work task list can be synchronized with the ALM tool to allow security stakeholders to push requirements within the ALM tool into a user's workflow with prioritization, best practices, guidance, and risk analysis required for the user to implement it. The user can then continue to work inside the ALM tool and as work is completed, the present system can be kept up to date with the status of corresponding work and training requirements. A two-way synchronization between the present system and an ALM tool therefore enables users to communicate the priority and status of work to team members and managers.

Microlearning can be delivered in a variety of electronic forms in training modules that contain engaging content so that users learn from materials designed to engage learners and maximize knowledge retention. Some formats that training modules can take include but are not limited to one or more of text, slideshow, video, audio, photographs, virtual and augmented reality. Microlearning can also include games, mock exercises similar to real-world tasks, puzzles, mini-tasks or quizzes, and other interactive media. The training modules can also provide one or more links to external resources, recorded or archived material, live coaching, or demonstrations. The microlearning modules in the training modules presented are directly related to the task at hand and are offered alongside and embedded in the graphical user interface presentation with the required task. Using microlearning training modules the presently described method and system can provide training that is short enough for users to consume in non-disruptive nuggets during work and development cycles while providing pertinent and timely information and knowledge to assist with ongoing work. Concurrently, users can progress in their training along their training goals and training can be seamlessly incorporated into workflow.

A centralized knowledge or training database 106 contains a central repository of updated training which is provided to users based on the requirements identified for their particular project as well as organization protocols and organization knowledge. Accessing the training database preferably occurs throughout the workday so that relevant guidance and assistance can be provided to users as they progress with their work and through the tasks on their work task list 102. Both the task database 114 and the training database 106 are preferably updated regularly such that updated requirements can be quickly added to the prioritized task list of a project that requires immediate action and so that up-to-date training modules are relevant and available. Newly created tasks can also be manually or automatically added to the task database 114 if the task could be generalized or applied to more than one work instance.

In a software development lifecycle (SDLC) project, software development and maintenance training modules can be provided in the training database 106 alongside up-to-date security guidance for the software application to assist developers with timely and proper training for coding secure software at any stage of the project. In one example, a newly identified code or data breach can be described in a training module and added to a training database 106 as soon as the organization becomes aware of it. The training module that teaches about and addresses the security issue can then be disseminated to all users in the organization whose work is affected by the new issue in each user's training module list 104. In this way, software engineers can be provided with updated knowledge from the training database 106 throughout the SDLC, including during creation of the project, as well as during the requirements phase, design phase, development phase, test phase, deployment phase, maintenance and update phase, replacement phase, and deprecation phase. Developers can also be pushed relevant training modules in their work tasks or training module list 104 to provide immediate knowledge on emerging security threats and how to handle them.

The user profile 110 is used to track user training, training module completion, and can optionally also be used to track task completion and metadata associated therewith. When the user completes a training module, the user profile records the completion data optionally with accompanying metadata, to track how the user is progressing with training and learning. Other information can be added to the user profile which can assist in recommending training, including but not limited to user education level, external courses completed, and school(s) attended (which can provide information on connections as well as potential educational strengths and weaknesses). Other data which can also assist in the recommendation of additional training can include manager reviews of user work, time to complete a task, and training behaviour such as number of times and how a microlearning module was accessed.

Since the user profile 110 contains information on user knowledge and level of training, it can also be used to provide just-in-time training and education when an imminent situation is occurring. Consider a situation where large scale organization-level events are occurring and an organization wants to communicate the events and training to a user. In the case of software development, a database could be down, a website overloaded, or there could be an outage that may require time to address. In this situation experienced workers could be quickly informed of the situation but would already know what to do to either address or work around the situation until it is resolved. For them, a task or notification can be sent out advising them of the event, optionally accompanied by additional higher level training information. For less experienced workers who have previously had no exposure to those database or system issues, providing training or education into how to handle particular situations can assist them in properly avoiding issues or responding to the situation. In a system workflow, if an imminent situation occurs and a particular user has not received training on how to manage the situation, a high priority task can be added to the user's workflow or work task list 102 along with one or more training module relevant to the task. Alternatively, a high priority training module can be added to the user work interface 112 or training module list 104 for immediate attention. In this way information pertinent to an immediate and/or ongoing situation can be disseminated quickly and appropriately to the individuals who need it along with information targeted specifically to each user based on their user profile 110.

In historical training models, a user would take a training course over a period of hours and receive a certification of the training. This model, however, provides no immediate and relevant work-related opportunities to practice the knowledge gained, and if gained knowledge is not used soon after the training course the information will likely not be retained. In addition, such packaged course material may not be accessible to the user when a task comes up that requires knowledge in the course domain. One advantage of the present system and method is that training courses can be split up into microlearning modules where each module contains a small piece of the knowledge required to complete a task, and the modules can be provided at the time that the user is completing the task in their work order on the work task list 102. Taking user focus briefly away from a work task and to a relevant training module, then back to the task at hand has been found to be an extraordinarily efficient learning method which enables the learning to immediately apply what they have learned to complete productive work. Upon completion of any microlearning module the user profile 110 is updated to indicate completion. Should the user want to review the same training module at a later date, it can also be made available to them from the training database 106 for review. Organization of multiple training modules into course packages also allows users to complete course material over time while learning and digesting the most relevant material as it arises during workflow. Completion of all of the training module in a training course can provide the same certification as a standard continuously taken course but with better knowledge retention and on-the-job practice and results.

In comparison with current methods that software developers, in particular, use to seek out information and resources, such as by internet search or on developer databases such as Stack Overflow, the present system offers guidance and training that matches both the developer knowledge and experience based on the user profile and the task that the developer is currently engaged in. By integrating data on developer knowledge using the learning profile of the developer and comparing it with the requirements of completing the task that the developer has been assigned, the appropriate level, content, and type of training can be directly provided to the developer without the developer having to do any additional searching. This significantly expedites the task of locating appropriate guidance materials and directs the developer immediately to exactly the information they require to fully complete the assigned task. In addition, the employer of the developer can provide, right in the training materials served to the developer, targeted requirements according to their internal operating procedures and standards. These bespoke requirements specific to each employer or company will further guide the developer in producing work product that satisfied the employer needs and standards.

A database management utility linked to the system can be interfaced via a web application to permit an authorized user to link to a web application through any computing device, enter data into system, and be presented with content on the training module list 104, work task list 102, training database 106, and user work interface 112. In one implementation, a web application that runs the system can be provided to enable user access to the task list associated with a particular project. The system authenticates the user to make sure they have access to the relevant project space and the user is authorized to view a selected or complete task list as well as their training list. The web application can pull the user's task list or set of daily or weekly work orders as well as the list of training tasks required to be completed before doing the tasks on the work order. Navigation of the web application can be provided through a web browser or any other web application framework. The system databases can be hosted locally or can be web-based or cloud based. The present system can also be integrated with JIRA or can be provided as a standalone learning management system (LMS).

The present system is stored and run on one or more computing devices with memory and may be accessed by wireless or a wired network, or a combination thereof. The network can be a collection of individual networks, interconnected with each other and functioning as a single large network (e.g., the internet or an intranet). The network can be implemented as an intranet, local area network (LAN), wide area network (WAN), the internet, or combination thereof. The network may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. The memory may be coupled to one or more processor(s) and can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The system may also include one or more processors coupled with the memory to receive the organization framework and further configured to generate system processing commands. The computing device may be implemented as one or more microprocessors, microcomputers, microcontrollers, digital signal processors, central processing units, state machines, logic circuitries, and/or any devices that manipulate signals based on operational instructions. Among other capabilities, the one or more processor is configured to fetch and execute computer-readable instructions stored in a memory.

Figure 2:
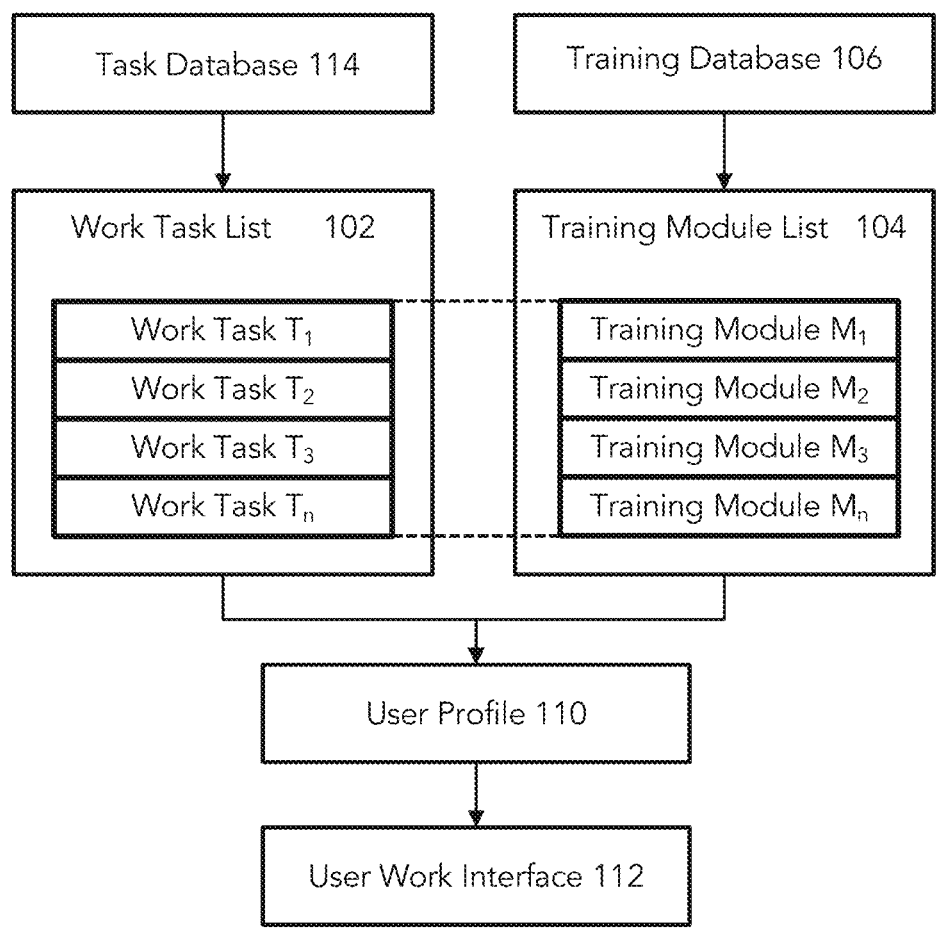
FIG. 2 is a block diagram illustrating aspects of the present system.

FIG. 2 is a block diagram illustrating aspects of the user interface of the present system. In one embodiment of the present method and system, tasks are assigned to the user work task list 102, optionally from a selection of tasks in a task database 114. The tasks in the work task list 102 are selected based on the team or project that the user is working on, and/or the responsibilities of the user. Tasks can be added to the user work task list 102 by management or by the user themselves, depending on the structure of the organization and/or task list. The work task list 102 comprises at least one task, but can also comprise many tasks ($T_1, T_2, T_3 \ldots T_n$), which are preferably listed in the user work interface in order of importance or priority. One or more larger tasks can also be broken up into smaller tasks to help the user manage and plan their workload, as well as to match smaller tasks to appropriate training modules. The training module list 104 for the user has a list of training modules ($M_1, M_2, M_3 \ldots M_n$) that are associated with the tasks on the work task list 102. The training modules on the training module list 104 are taken from a training database 106 and selected based on their relevance to tasks on the work task list 102.

A user profile 110 keeps track of which training modules have been completed by the user and can optionally leave out completed modules from the work task list or mark them as completed. Leaving a link to completed training modules on the training module list 104 easily enables users to review the material in a completed training module and have easy access to the knowledge relevant to the task they are doing should they wish to consult it. A user work interface 112 displays the tasks to be done, the available relevant training modules, and can also display additional information relevant to user workflow. In the case where a user wants to access additional learning or training modules that are not presented to them in the work task in the user work interface 112, the user can also be enabled to access the training database 106 independently for additional training material that they are interested in. This situation could occur, for example, when a user wants to refresh or update their knowledge on a related training task, or when additional training is desired.

Figure 3:
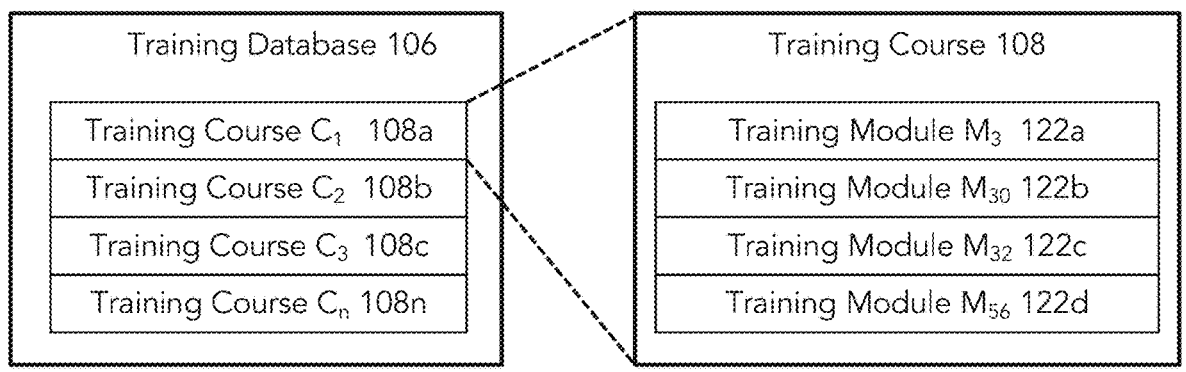
FIG. 3 is a block diagram illustrating an example mapping of training modules and training courses.

FIG. 3 is a block diagram illustrating one embodiment of components of a training database 106. The training database 106 can contain, for example, organizational, regulatory, industry, professional, trade, health, and institutional knowledge that is beneficial for workers to know as they complete their work. The training database 106, which can also be thought of as a library of knowledge relevant to the organization, is organized in training modules (122*a*, 122*b*, 122*c* . . . 122*n*), with each training module containing content directed to a small component of knowledge in the organization. The training modules can be further organized by theme, or preferably into training courses (108*a*, 108*b*, 108*c* . . . 108*n*), where each training course comprises a collection of training modules (122*a*, 122*b*, 122*c* . . . 122*n*) relevant to the theme or training course. Each training module is preferably a microlearning module comprising a bite-sized or segmented piece of knowledge that can be easily taught, understood, and practiced, in a few minutes. Upon completion of all of the training modules in a training course, a user can receive certification for completing the training course 108. A training course can have one or more training modules that overlap with other training courses, for example, and keeping track of a user's completion of each training module enables tracking of completion of their associated training courses without unnecessary repetition.

Figure 4:
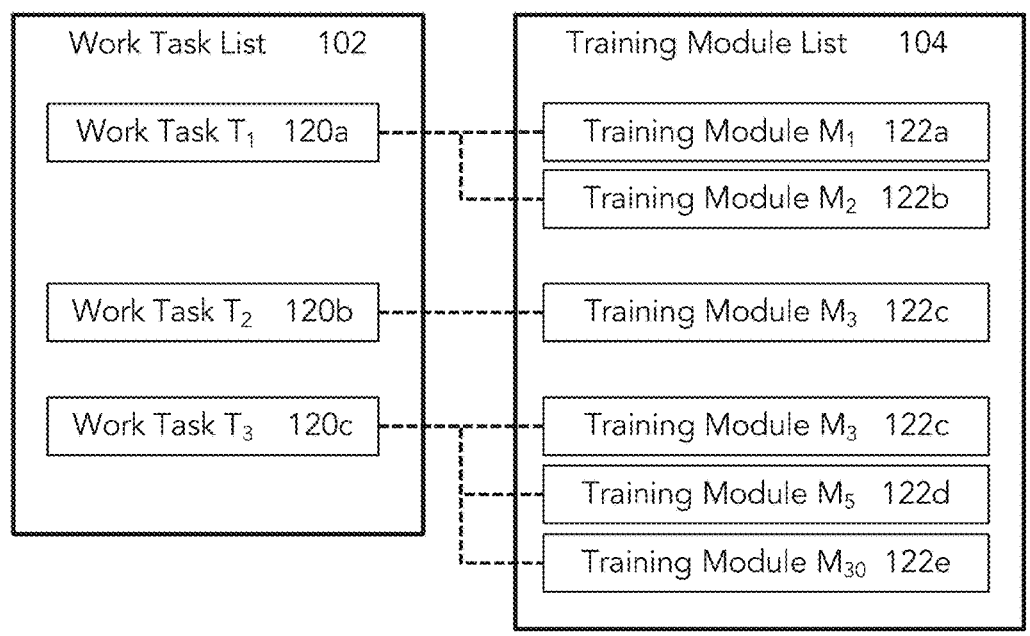
FIG. 4 is a block diagram illustrating an example mapping of work tasks to training modules.

FIG. 4 illustrates an example mapping of training modules and training courses in the present training system. The user work task list 102 comprises a set of work tasks (120a, 120b, 120c) for the user, preferably in order of priority, for a period of time, such as a day or week. Each of the work tasks (120a, 120b, 120c) has a set of associated training modules (122a, 122b, 122c . . . 122n) from a training module list 104 and taken from a training database which are relevant to the work task and also relevant to the user based on the user record of completed training modules as stored in the user profile. Each work task can be mapped to one or more training modules, and different work tasks can be mapped to the same training module. As shown, work task $T_2$ (120b) recommends or requires training module $M_3$ (122c), as does work task $T_3$ (120c). Once a user completes a training module the user profile will record completion and display the completion record next to the training module in the training module list, no matter what task the training module is associated with. For example, if training module 122b is shown as completed in a user profile, the training module will be removed, marked as 'completed', or deprioritized from the training module list and the training module list will prioritize other training modules or import other and more advanced training modules relevant to the work task. A training module can also be recommended to a user based on a task update, when a task is not being completed adequately by users in the system, or when a user has demonstrated inadequate completion of the task. A user can also be automatically assigned to a task or excluded from executing a task based on their training history.

Figures 5, 6:
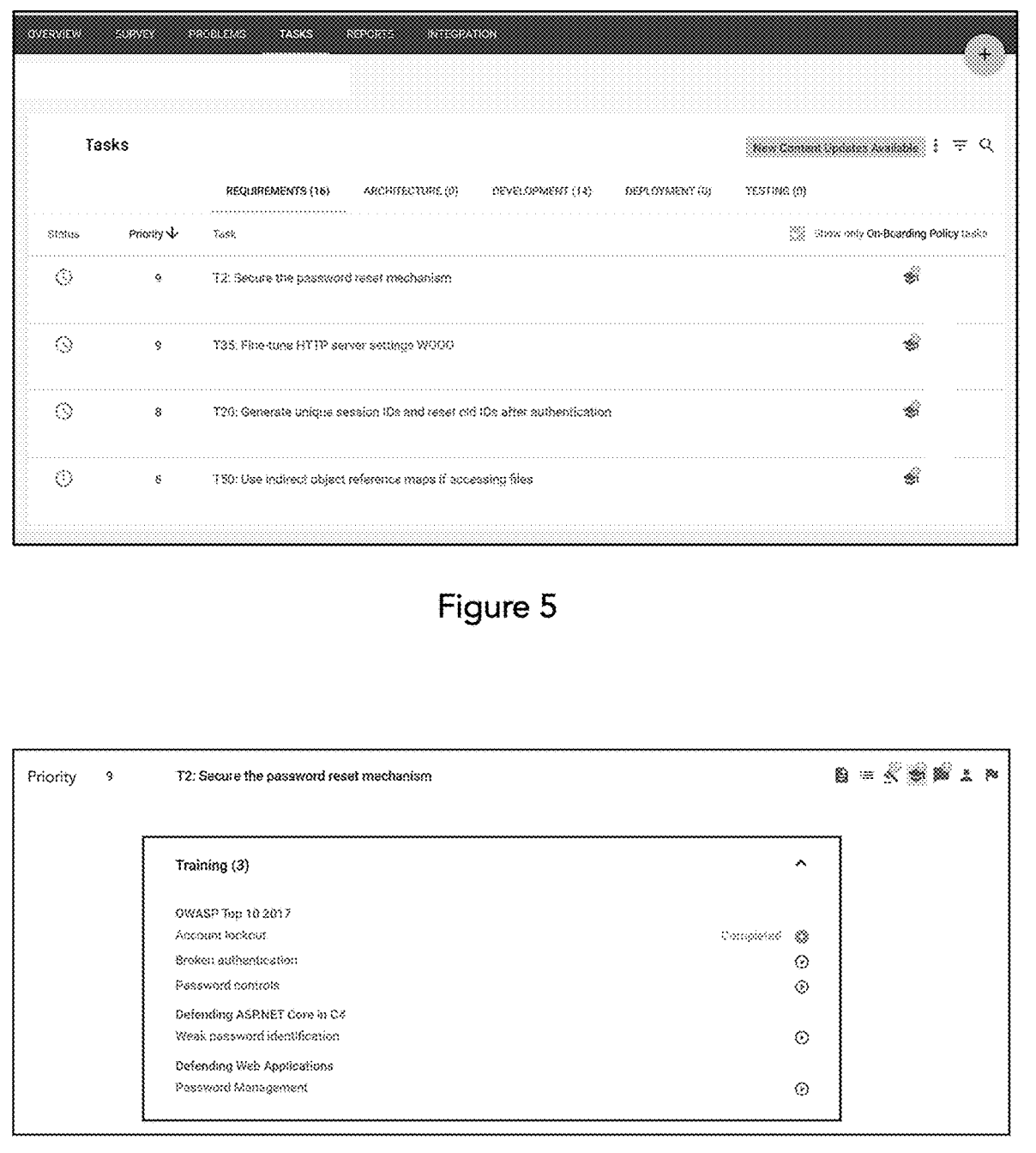

FIG. 5 illustrates an example graphical user interface showing a user work interface with a prioritized work task list. In this embodiment, tasks assigned to a particular user are selected from a task database, which comprises a list of tasks that workers in an organization would need to complete for a project in a work environment. A software development task database is described in the present disclosure as an example, however it is clear that other organizations in different industries will have other or different industry-specific tasks that are more related to work projects within their business. The tasks assigned to a user are listed in order of priority and can be assigned a priority number to assisting in workflow planning. Tasks are listed with a task number (T2, T35, etc.) as listed or indexed in a task database and an associated task title, with a link to the training task list on the same line. Each task in a generated task list can have zero or more associated in-context training modules, shown here as hats with little numbers where each number above the hat indicates the number of training modules associated with the training task. New tasks can be created and added to the task database as needed.

In the context of software development, just-in-time training provides developers with the content and direction they need, allowing them to apply directly to a work task what they've learned from training modules, and all as they build applications according to the requirements outlined in the training. In an example of just-in-time training for software development, a software development project can be split up into a multitude of tasks required for completion and/or maintenance of the software, and the tasks can be assigned to one or more developers or teams of developers. For security tasks in particular, a task list with each security requirement can include tailored relevant test cases and sample quality assurance test code, including tracking and audit trail information for satisfying requirement standards and audit criteria. For example, if the software application is used within a financial institution having credit card transactions, the task list would include regulations and control frameworks such as the Payment Card Industry Data Security Standard (the "PCI DSS"), COBIT, ISO 27001 (formerly 17799), GLBA, and the like.

In another example, if the software project is related to the healthcare industry, privacy regulations for medical data can be put in the task list. General training modules can be directed to, for example, best practice rules concerning the design of software code to produce software applications, non-functional requirements, regulatory requirements, rules concerning security structures, and procedures for communication on the Internet for particular businesses. Specific training modules directly related to the security tasks can also provide training on potential risks that may affect the security of a software application combined with their mitigating controls. The mitigating controls can have technology-specific guidance for developer use to address the potential risk. Each task can further include links to one or more training modules in the training database to provide additional background and knowledge to a developer who may not be fully familiar with the task or how to complete it. When developers get relevant just-in-time training while writing code it ensures maximum retention, at least because they can implement their new knowledge right away as the new learnings are immediately relevant to the task they are currently engaged in.

In software development and in particular for incorporating security requirements into software, just-in-time training can also be advantageous for development teams as new security threats can emerge during the SDLC that developers need to safeguard the software from. For secure software development, for example, developers can be provided with a task list comprising prioritized security and regulatory compliance requirements alongside training modules for training developers on how to address security requirements, remediate software application vulnerabilities, and embed security features into their applications. In this way, developers can catch security vulnerabilities after deployment, as well as before they are deployed, and incorporate security into the production or release of software by maintaining focus on secure software development and maintenance while being provided with appropriate training materials to complete the required tasks. Further, security threats can be known prior to software development, or can emerge during the software development lifecycle, during development or after launch, all of which need to be adequately addressed. Developers often do not have all of the required skills or knowledge to fully address security in software, and when new threats emerge new skills and techniques may be needed. By infusing security training early in the software development life cycle developers can be made aware of known security threats and can building security into development while receiving training on the job to address security concerns. This continuous deployment methodology requires that developers know and understand the security risks and regulations when they code. Specific technical guidance such as tailored secure coding guidelines and specific technical guidance on avoiding writing insecure code can also be associated with each security task and provided to developers so that more secure code can be written in the first place. New threats can also be addressed quickly by offering new and updated training modules that assist developers with software safeguarding. Along with learning while coding, developers can build software quickly and embed security throughout. In an Agile software development organization, integration of the task list with training enables developers to quickly create working, tested code, that delivers value to the organization and concurrent relevant training to the user.

Management can also globally add to the task database and/or training database as issues arise and push items to users' task list or training module list to provide timely training or information. Certain company-wide information can be shared, for example sensitivity training, updated safety training, evacuation training, announcements, or updated branding and procedural guidelines. Training tasks can also be time-bound, such as required to be completed by a certain date, required for refreshing every certain period of time. Training tasks and training modules can be updated as needed, for example to change to the prioritized security requirements task list to change focus and mitigate risk according to best practices. Task prioritization can also be rapidly adjusted based on, for example, the public electronic security environment of the software application to direct developer attention to issues that require more immediate attention at any point during the SDLC. Once the application has been launched, security updates to the knowledge database can trigger software application updates based on the identified software context of the application to maintain the security standards and mitigate risk of the software application during its lifetime. The centralized security knowledge database covers all life cycle phases, from application birth to deprecation, accordingly maintaining updated task guidance and training ensures that security is built into the software application from the early phases of the life cycle and maintained as the knowledge database is updated with security and regulatory updates.

FIG. 6 illustrates a graphical user interface with associated training modules grouped by training course. By selecting a task in the user task list, the task data shows which training modules are in scope for the task and provides links to launch each associated training module. In this example, the training module "Account lockout" recommended for learning to complete the task "T2: Secure the password reset mechanism" is part of the training course "OWASP Top 10 2017". Integrating the task list or work order list of each developer with a training task list, learning modules can be automatically added to each developer's task or issue tracker to ensure that the developer is fully enabled and trained to complete the tasks. This allows for an on-point, timely environment for frictionless learning where the user is provided with exactly the knowledge they need exactly when they need it in order to complete the tasks on their task list. The training task list can also be provided and made available by embedding it within tools that users already use to complete their day-to-day tasks, such as JIRA™ for software developers. For other users, the present system can be integrated into other to-do list platforms so that task-associated training can be linked to each task and offered in preparation for the user's work order list or task list for the day. After completing a training module the user profile is updated to provide an indication that the training module has been completed by the user. In the training module list completed training modules can still be listed as well as links to completed training material should the user wish to review a completed training module. In this example, the training module "Account lockout" is marked as completed however the training module remains linked and available should the user want to review it while completing the associated task T2.

Figure 7:
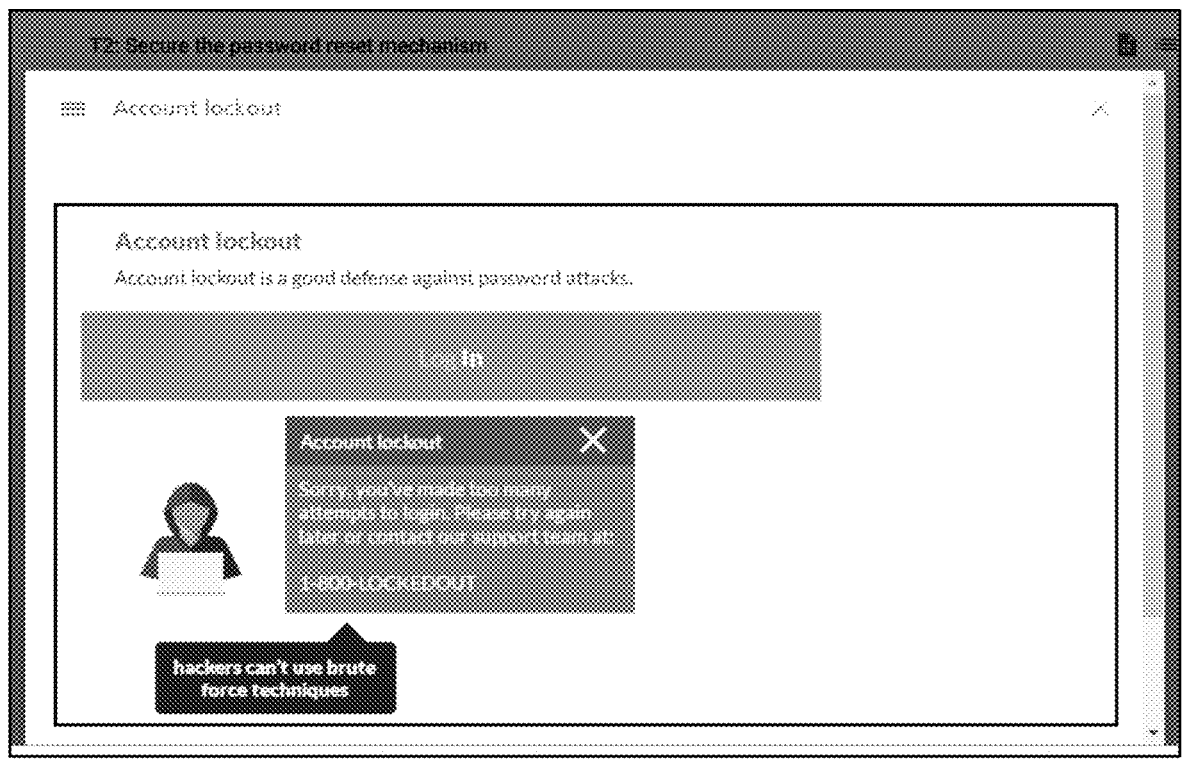
FIG. 7 illustrates an example graphical user interface showing a training module information page.

FIG. 7 illustrates an example training module start page in a graphical user interface. Clicking or hovering on the link to the microlearning training module "Account lockout" provides a start window, introduction page, popup, or other indication providing information on the training module. Micro learning modules can comprise various types of media and interactive resources to engage the user and provide interactive opportunities for the user to learn the material. Media in the learning modules can be a combinations of one of more of text, slideshow, video, audio, games, puzzle, virtual reality simulation, augmented reality, mini-task, quiz, external link, and interactive media, for example.

Figure 8:
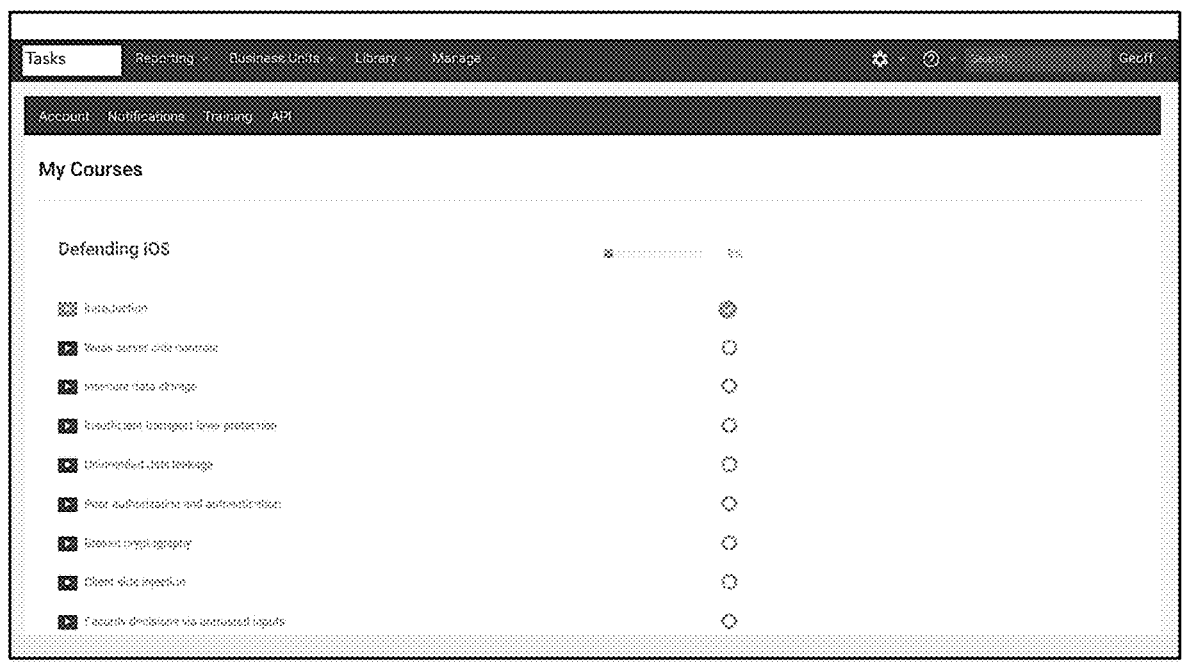
FIG. 8 illustrates an example graphical user interface showing a training course navigation page.

FIG. 8 illustrates an example training course navigation page with an inventory of microlearning training modules for the course in a graphical user interface. In this example, the training course "Defending iOS" comprises a variety of microlearning training modules which can be completed independently, or sequentially. Once a user has completed each training module the module is marked as such, along with any metadata associated with the training module and/or task completion, and the training course can indicate its degree of completion, as in this case with a percentage completion. Training module completion metadata can include, for example, time completed, date completed, amount of time taken to complete, and the associated task that the training module was completed alongside. With a training completion navigation page users can keep track of the courses and modules that they have completed and view which additional modules and/or courses are on their learning path as selected by themselves, their manager, the company priorities, or based on current or future tasks or projects assignments. Users can also navigate to a course navigation page because they want to learn more about a particular topic, because the course is relevant to work they are doing, or both. In some cases if a user has completed a certain number of training modules in the course the system can alert the user that completion of a few additional training modules will earn them a certification in the training course. Incentives can further be provides to users to complete training courses which can further motivate them on their learning and training path.

Figure 9:
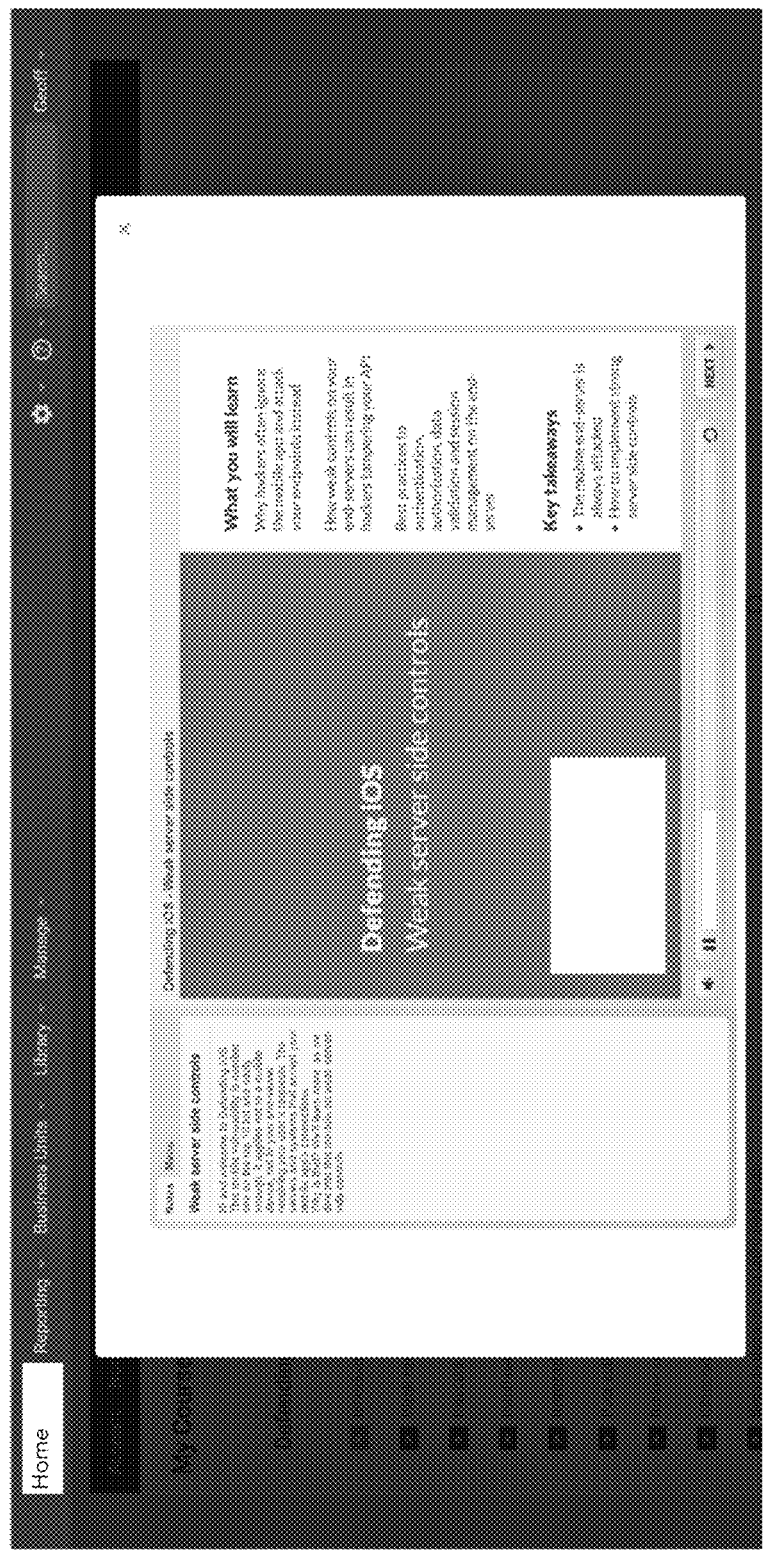
FIG. 9 illustrates an example graphical user interface showing a training module start page.

FIG. 9 illustrates an example graphical user interface with a training module start page. The training module "Weak server side controls" is a microlearning training module which is part of the "Defending iOS" training course, shown in FIG. 8. The training module may be multi-media, such as audio and video, and can also provide augmented reality or virtual reality training where a user can perform training in a virtual environment before doing it in a real environment. In some examples, users can use augmented or virtual reality systems to practice operational procedures such as, for example, medical procedures, automotive maintenance, aircraft maintenance, manufacturing, parts assembly, machine calibration, chemical formulation, and clean room procedures. The training modules can also link with other multi-media technology such as, for example, an augmented reality device such as headset to provide augmented learning and real-world context to training. In one example, a mechanic can be provided with an augmented reality simulation of a task for practice before attempting to complete the task on a physical device. Institutions and organizations can also have the ability to customize the content in the training modules to align with their corporate practices, procedures, and business objectives. Task and training task content can also be customized for each organization by adding, for example, company branding, custom videos and photos, graphics, mottos, and images. Work tasks and training modules for a company or organization may be thereby entirely customized to suit the requirements of the organization.

In an example, a pharmaceutical manufacturing company will have good manufacturing practice (GMP) to ensure that products are consistently produced and controlled according to quality standards. Learning and training tasks for workers in this industry may include, for example, how to properly enter and exit a clean room, how to properly wash hands, how to document spills, how to prepare solutions, how to clean machinery, and how to dress and undress with personal protective equipment. For a worker required to enter a clean room and titrate a sample, for example, being proficient at all of these tasks is critical for the organization to maintain GMP standards. In particular, where biological contamination is a risk, decontamination of workers and materials prior to entry into a sterile environment is important for maintaining the space clean and uncontaminated. In this example, a training module on "How to Enter a Clean Room" can provide a tutorial tailored to the exact clean room on the premises that the worker will be using, including video and photo imagery of the location of necessary items, cleaning stations, etc. in the clean room for completely customized training. When a new pathogen emerges in this type of workplace, for example, education of workers on how to protect workers as well as organization assets can be updated in training tasks with associated training modules to ensure that all workers are properly educated. Further, the organization can track which workers have completed the training by monitoring the user profile for each user such that the organization can ensure that all workers are up to date with essential and/or required training for their position and responsibilities.

The asynchronous offering of the training modules means that workers can access the training modules at any time, take e-learning courses at their own pace, and review the training material right before they are going to do the related task, or even during the task. Because the training and task are linked the worker does not have to wait for training or go looking for training modules in a training database, for example. Providing training at the required time is expected to increase the accuracy and performance of workers and result in fewer mistakes and errors. Because just-in-time training is provided right at the time a worked needs it, on-the-job errors can be significantly reduced. Electronic microlearning modules stored in the training database also enables each module to be updated or changed as desired or required by an individual organization. Content can be regularly updated to provide the most updated content that includes modules for new procedures, protocols, including new threats and vulnerabilities. Just-in-time training can also help ensure learners are being provided the most up-to-date content, as smaller pieces of information can be more easily revised than an entire course. When regulatory standards are changed, risk policies altered, or best practices are modified, organizations can, and should, provide users, with the latest content and training to prevent mistakes and ensure work quality.

Figure 10:
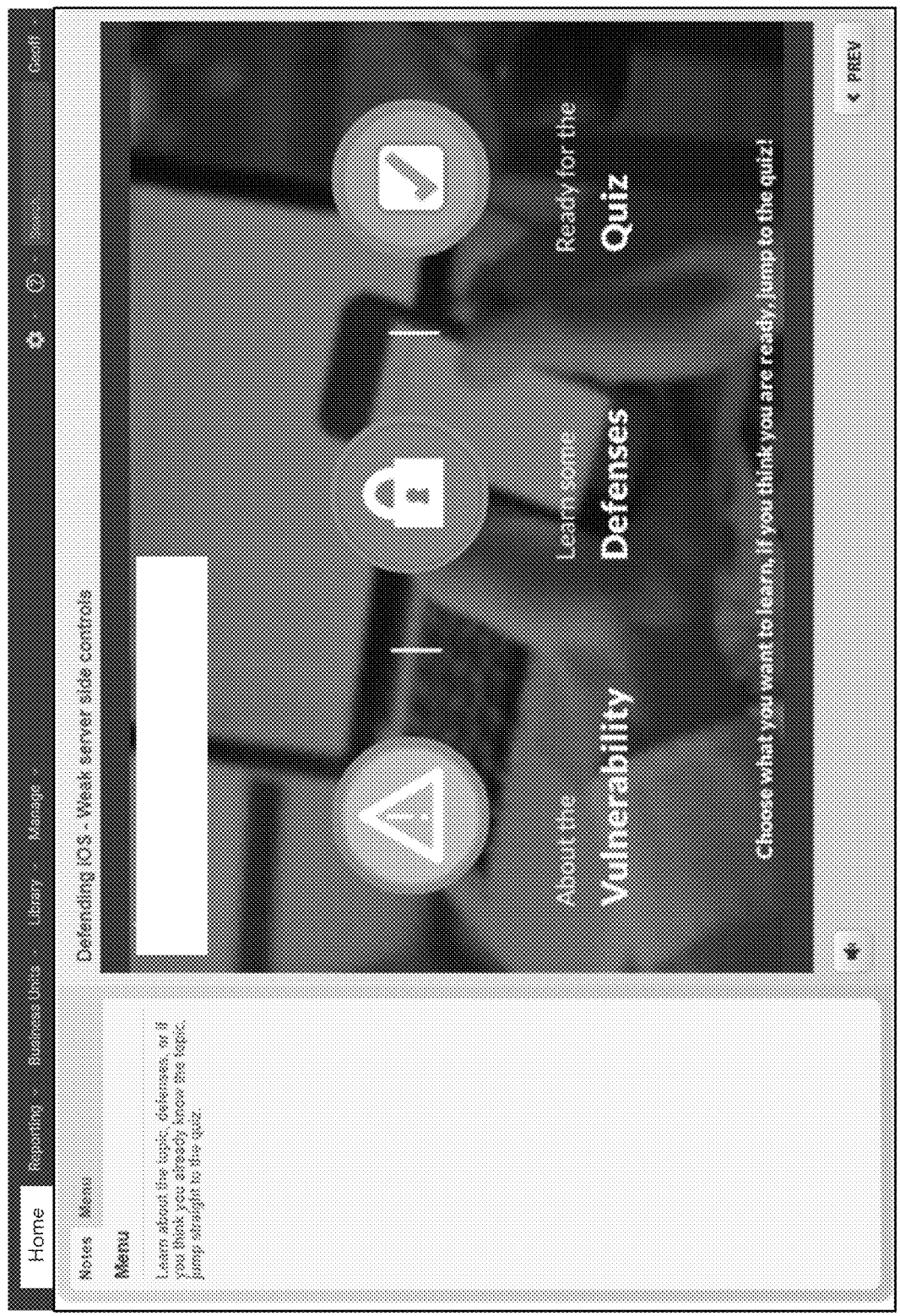
FIG. 10 illustrates an example graphical user interface showing a training module navigation page.

FIG. 10 illustrates an example graphical user interface with a training module content page. The course shown is broken down into various sections including a quiz to test a user's knowledge. The training module material can be presented in a variety of formats including, for example, text, slideshow, video, audio, games, puzzles, virtual reality, augmented reality, mini-tasks or quizzes, and other interactive media. For advanced workers who may already know the content in the training module, passing the quiz can be sufficient to record that they already have knowledge of the material and the pass result can be added to their user profile.

Figure 11:
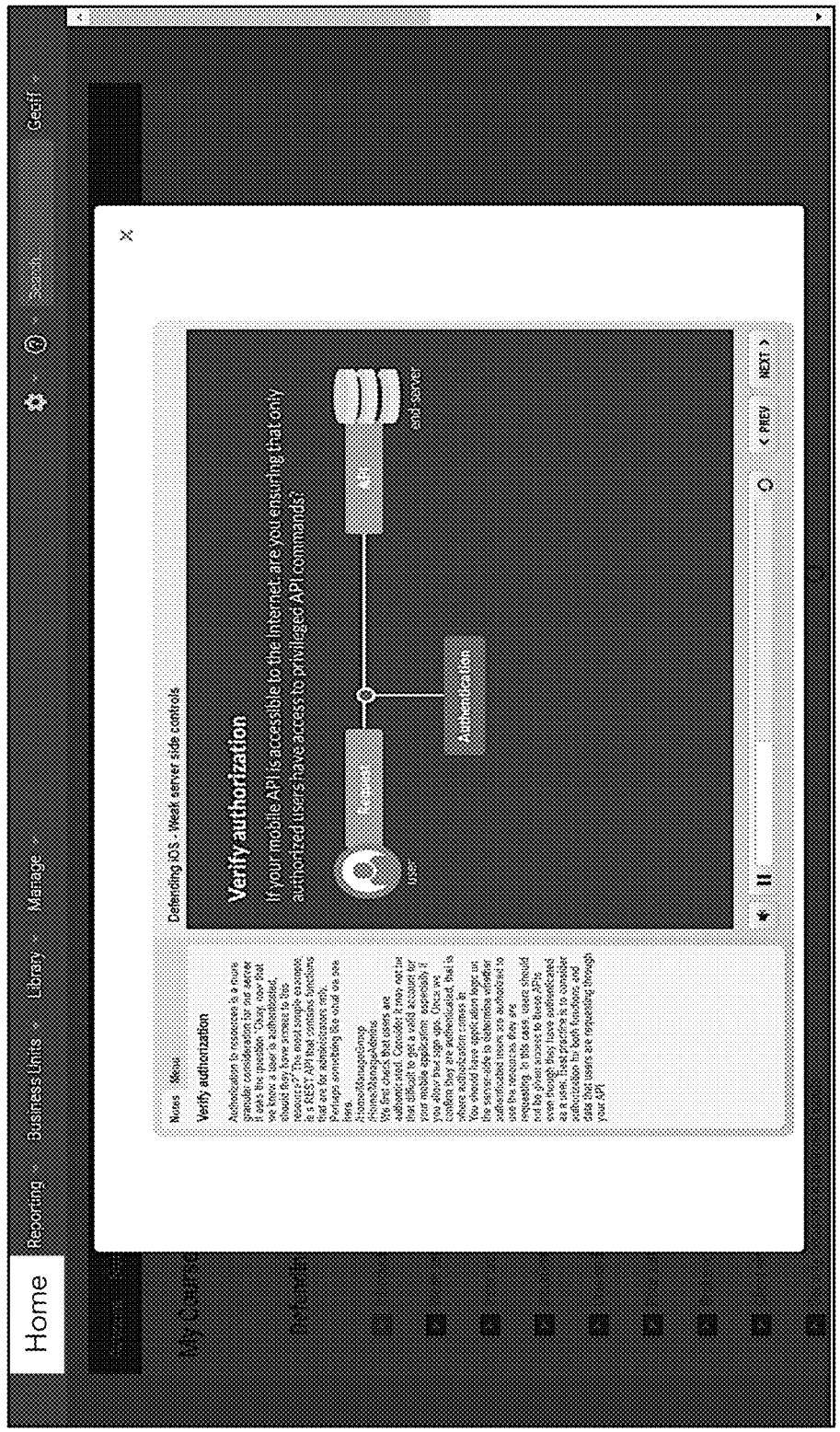
FIG. 11 illustrates an example graphical user interface showing a training module content page.

FIG. 11 illustrates an example graphical user interface with an example training module start page. Course content segmented into discrete training modules provides a micro-learning environment to take a user through aspects of the work, and contextualizes the work and how to accomplish it. The training module shown "Weak server side controls" is part of the training course "Defending iOS," as shown in FIG. 8. Course content can provide background on why the issue is important, one or more ways to address the issue, considerations when completing the work, examples of work done well and work that requires improvement, potential pitfalls, and links to additional resources. In addition to content, mind maps, flowcharts, memory aids, and other organizational information can be provided to assist with learning, understanding, and memory. Course content can also be updated as needed for improvement or updating of the course or to make the course more organization specific, or to meet the requirements of the work product.

Figure 12:
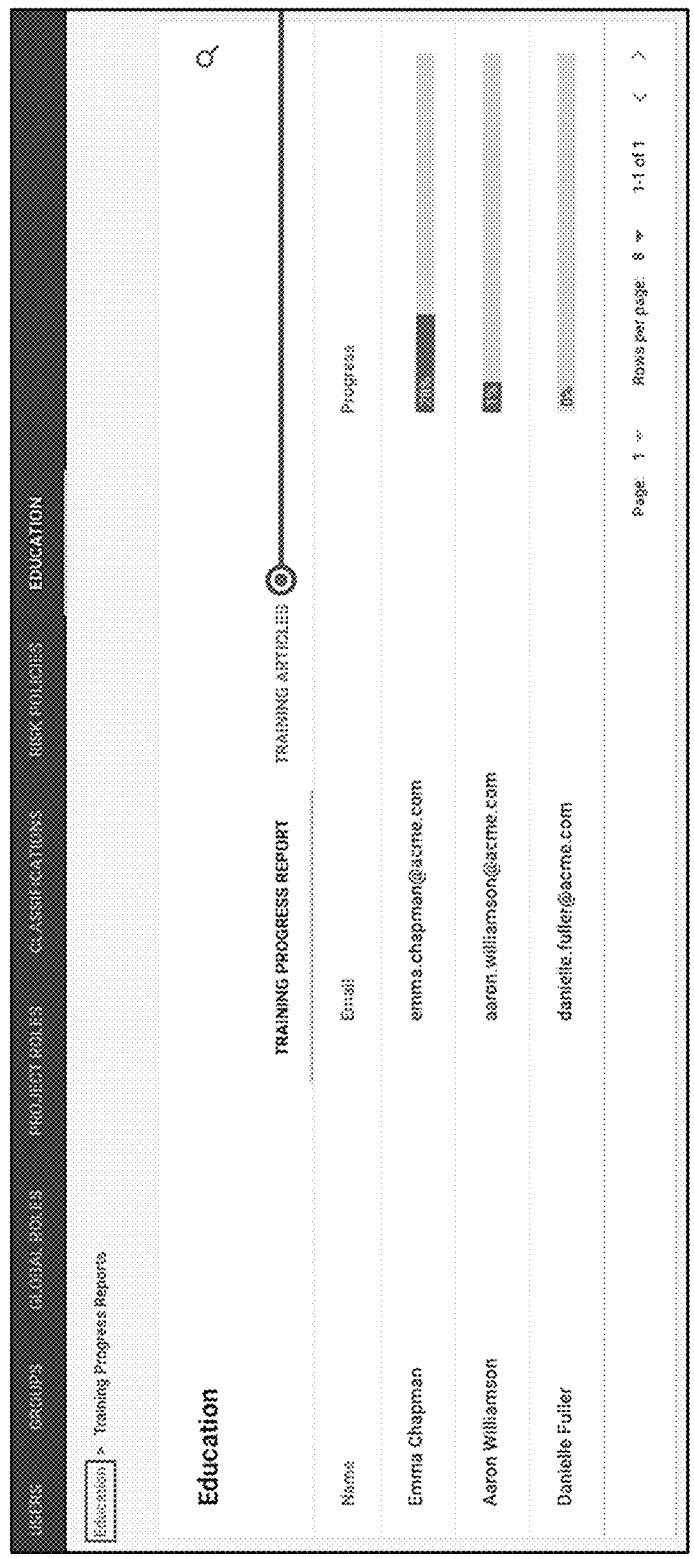
FIG. 12 illustrates an example graphical user interface showing a management page for user training.

FIG. 12 illustrates an example graphical user interface with management page for user training. Managers and administrators can access performance tracking of user task completion of users as well as training completion. In an example, management teams can also be provided with real-time visibility of a project's verification status during production in addition to the training completion record of a particular user or team. Administrators can view and report on the training progress of all users and generate exports such as reports and perform data analysis. The system can further evaluate what a particular user or worker knows or is capable of based on information obtained in the user profile from task completion, training module testing results, or other user interaction with the system. This can be used to assist managers with work allocation to decide which developer or user to assign with which set of tasks, and can also indicate to the user what they need to learn next, to review, or what additional learning modules or training courses may be helpful for improving their work, learning, and advancing in their job. Since the system keeps track of the training progression of the user as well as the tasks that the user has in queue and the team the user is on, the system can offer the next level of training to the user based on the user's experience, interest, and job-applicability. In particular, the system can anticipate and recommend training using additional inputs such as but not limited to the user's role in the company, the user's work experience, the user's previous project or next project, the project context, required deliverables, completion of other training, social connections, group membership, geography, and real world objects (e.g. augmented reality input). In one example, a regulation update relevant to hazardous materials transfer in California can provide a training task update with associated training module only to workers living in California who work with hazardous materials. If a user has expressed an interest in moving into a managerial or team leadership position, learning opportunities can be provided to position the worker for advancement.

A log of individual user performance on work task completion as well as training task completion in the user profile can also provide tangible security audit evidence and trace compliance with security standards, along with any useful metadata regarding completion of the task. Specific auditing and regulatory guidelines can be generated and traced for later use to generate required reporting, and additional data may be collected on when guidelines are employed, implemented, and tested, and by whom. Reports of compliance can also be generated for audit purposes as well as regulatory purposes, such as demonstrating compliance to requirements, implementation, and testing guidelines, in situations in which compliance with particular standards is needed. Useful metadata may include time of day when task was completed, duration on the task list, number or identification of training modules completed while the task was in progress, and duration of time required to complete the task.

Identification that training tasks have been completed by workers provides traceability and allows stakeholders to communicate completion of regulatory standards and audit reports. Once a task has been completed by a user it can be so designated by manually clicking a button or entering data, giving project teams auditability as to which user and at what time has completed which actions. Project managers can concurrently track if workers have followed appropriate guidelines and received adequate training to complete the task. Particular tasks may be further categorized as requiring manual verification based on knowledge that successful completion may not be adequately detectable by automated means. The task database can further comprise information on which tasks require human verification, which optimizes time use of managers, and alert managers on when employees have completed certain tasks such that they can be verified or checked. Indicating a user training or course completion further provides managers with information to assist them with work allocation to indicate which workers are proficient at which tasks. Managers can allocate work based on experience, proficiency, or provide less experienced workers with training and new work opportunities based on task and training advancement and business goals.

Managers can also see the progress of members of the team on course education goals in the user profile to track how well team members are doing on their goals and also to gauge their interest in other training paths. Recently completed courses from team members can be shown to the manager, including date of completion, speed of course completion, and percent of team members who have complete the course. Progress reports from individual teams members can also be shown to the manager, as well as progress along course goals and timing of completion. Individuals can be on a learning path with a set of courses, or alternatively individuals may be assigned particular courses by a manager to improve their skills in a particular skill set. Assignment of training courses to individual workers can also assist managers with filling in skill sets in team and for ensuring that workers are up to speed on skills and knowledge required for current and upcoming projects. The user profile for each individual can provide additional information on where every individual team member should start and progress on their learning path, providing a start point as well as tracking of educational activity of developers on their learning path. If a learning path or course is out of sync with the tasks the workers is being assigned, the workers can still learn the material from micro learning modules presented in the worker's tickets or task list from a module or course search in the training database, and progress can be made along the skills required for the assigned tickets.

Classifications of roles in a company can also be put onto general course education paths to ensure that all individuals in that company role are gaining knowledge, skills, and experience, as well as certification, along their training or learning path. Teams can also be directed toward particular learning paths depending on what project they are currently working on, and managers can use the user profile and training record for automatically allocating a worker to a particular task based on their training and skill proficiency profile. In example, a particular worker or developer may have particular skills and proficiency at some skills, but require training in others. As a whole, teams may also have a skill set or proficiency at certain tasks, but deficits in others that can be remediated by targeting training. In one example, a manager requiring skills in web app, web services, mobile client, rich client, can direct members of the team toward the most relevant education for their current project, and allocate team members to particular tasks based either on their skill proficiency or desire to learn those skills. In addition, relevant technology for the current project can be prioritized on the course path, for example courses for developers directed to particular software languages, applications, or architectures. Particular regulations and compliance that are required for a current project can also be prioritized based on the team member role on the team and the project that the team is currently working on. Accordingly a team can have a particular education goal prioritized to match the work that the team is currently working on.

Figure 13:
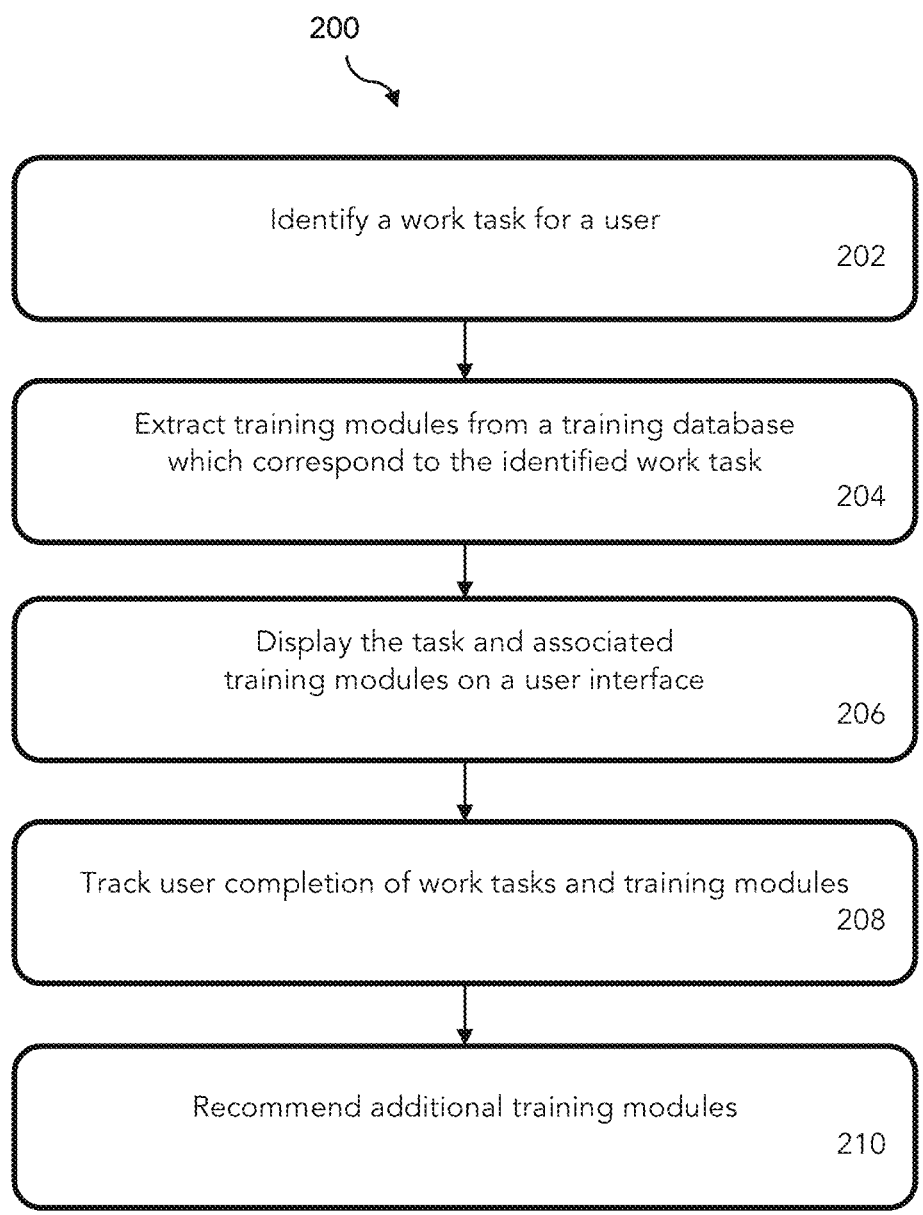
FIG. 13 is a flowchart of an example method for just-in-time training.

FIG. 13 is a flowchart of an example method for just-in-time training. First user work tasks are identified for a user 202. The work tasks can be identified from a task database, can be manually selected or created, automatically generated based on a work or issue tracking or organizational system, or a combination thereof. A task database can be internal to an organization or can be gleaned from an outside organization or existing task database. Tasks can also be created by a user, manager, or other member of an organization, and optionally linked by the creator of the task to training modules from one or more training database. For the identified work task or tasks, training modules are extracted from a training database which correspond to the identified work task 204. Preferably each task in the task database will have an associated training module, and the associated training module will be imported into a training task list when the work task is identified for the work task list. In newly created work tasks, a matching engine can identify elements of the work task from the task context and identify keywords or context that matches to relevant training modules as described above.

The identified work task or list of work tasks and associated training modules can then displayed, independently or together, on a user interface 206 so that the user can manage workflow as well as training and relevant source material and information for completing their work. User completion of work tasks and training modules is tracked 208, preferably in a user profile, and can be optionally presented in the user interface as percentage complete, or time required for completion. Metadata relating to use and completion of the training module can also be tracked in the user profile, such as time to complete a quiz, quiz score, time to complete a training module, time between training module completion, or other metadata. The system then preferably recommends additional training modules 210 to the user. The recommendation of additional training modules can be based on, for example: past training; past performance; tasks upcoming in the user task list; tasks the user has shown poor performance at in past; knowledge they have not learned yet that is related to other material they know; courses that they have expressed an interest in taking; future work goals; and new or emerging knowledge relevant to their job. The system can also identify additional training tasks from the training database that may benefit the user in performing their work more proficiently. The training modules offered can be automatically anticipated by the system, or selected by the user based on their learning goals or desires, or a combination thereof. In this training schedule, training modules offered may not necessarily be directly related to particular tasks in the user work task list, but may be offered independently and in alignment with user or organization goals. The system can also be used to identify gaps in user training and points of knowledge deficiency such that certain training can be recommended or mandated.

A user training program can further be configured or be scaled contextually using artificial intelligence (AI) or other processes to predict associations between training modules and work contexts that haven't been explicitly defined but may be of interest. In particular, the present system can recommend training and task modules for users based on historical behaviour of other users and user allocation on projects to learn expedient patterns of recommendation and user allocation. Similarly, users can be subscribed to a training ladder such that new training modules can be offered to them on a regular basis to provide a continuous training environment and enhancement of skills. Incentives can also be offered to encourage worker training advancement or to incentivize completion of particular training. By tracking user's training completion and past participation employers can offer users with advanced responsibility or advanced application roles and identify rising or motivated stars. Organizations can also reward user participation with gifts, bonuses, social acknowledgement, or other incentives. The system can further be integrated with payroll or other credit systems to incentivize training.

Figure 14:
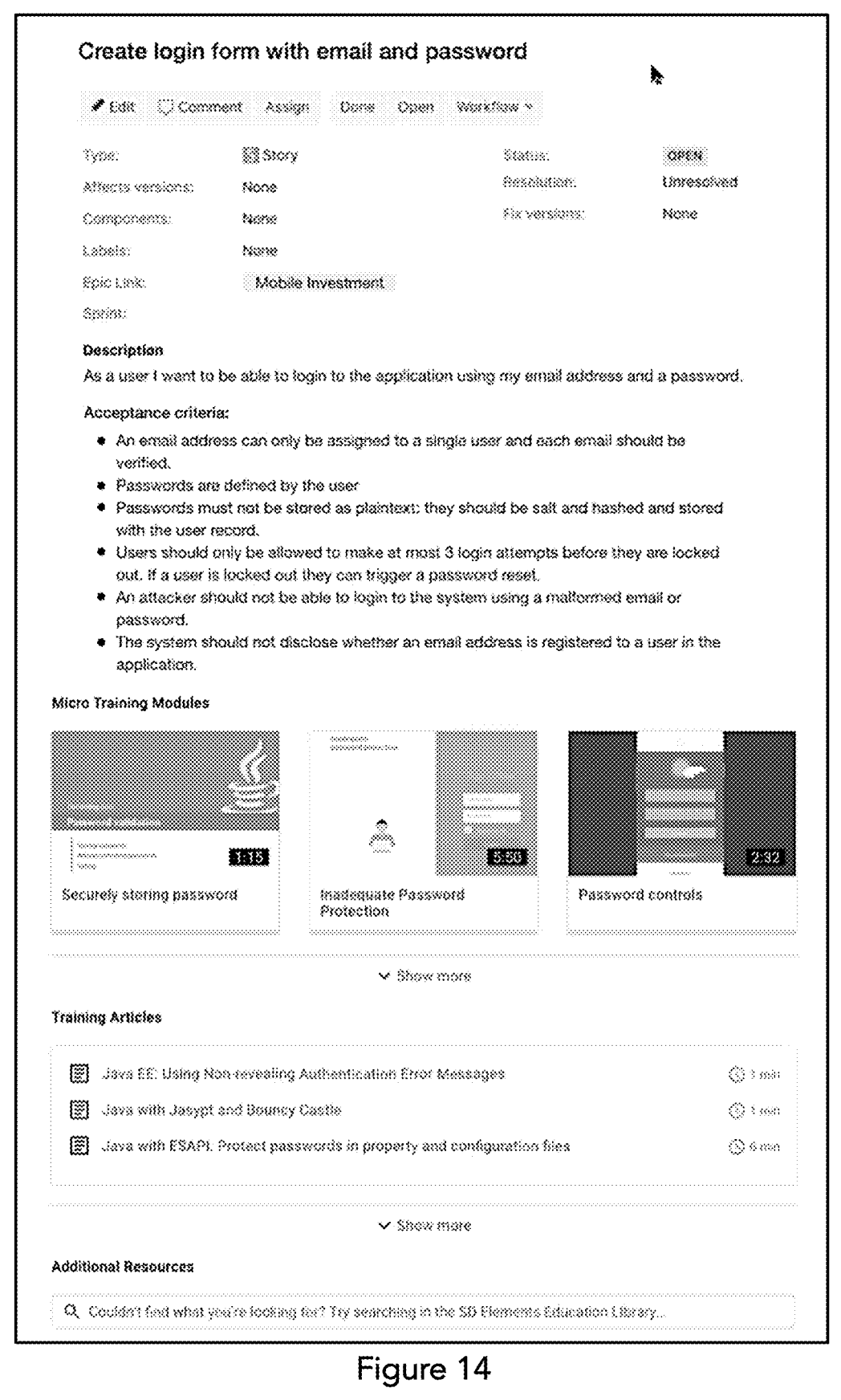

FIG. 14 illustrates an example graphical user interface showing a work task with task requirements and associated training modules. In a background example scenario, a software developer at a small bank working in a development team is working on authentication system for the bank's new mobile investment app. Banks need to follow a strict set of strict regulations and compliance, and the software developer is aware of most of the regulations that a security protocol needs to follow to follow those regulations and compliance requirements. However, there may be nuances to some of the tasks that are specific to the bank itself, and the software developer may not be aware of all of the internal bank standards and requirements. In addition, new security issues and security loopholes may have come to light that the developer may not know about that need additional attention.

In the developer's work flow the developer is provided with a first task to create a login form with email and password, which can be provided as, for example, a JIRA ticket assigned to the developer. Along with the task and associated requirements, the developer is also provided with a set of training modules directed to securely storing a password, inadequate password protection, and password controls. These training modules are embedded as training modules alongside the tools in the task ticket to provide additional information to the developer on how to complete the ticketed task. The training modules provided to each developer are further selected on the basis of the developer's user profile which keeps track of which training modules the developer has already completed and the developer's level of training. As such, more advanced training can be provided to more advanced developers, and more fundamental training can be provided to more inexperienced developers. Acceptance criteria for task completion can be set out clearly in the ticket to ensure that the developer can implement the requirements according to the criteria.

Training modules can be further tagged so that they are positively associated with relevant modules. Additionally or alternatively, selection of training modules can be identified using search, tags, artificial intelligence based on previous identification of relevant tasks, or a combination thereof.

Further, text and audio in the training modules can be used as metadata tags to bring forward training modules relevant to a particular task or ticket. Over time human selection and searching results, as well as relevance assessments provided by developers, can assist with machine learning of the training system to bring forward the most relevant training modules for a particular task. The training modules can be a pop-up inside the ticket, inside the issue or task tracker, or in another window or browser tab.

FIG. 15 illustrates an example graphical user interface showing an internal training module search in the training database. If a developer is looking for particular information or wants to re-watch a training module, a search in a search bar can provide internal access to the developer to the training library which contains general and company-specific training modules and standards.

FIG. 16 illustrates a section from a graphical user interface providing a list of task-specific training modules and training articles. Each module and article is preferably marked with the amount of time required to complete the module, and the type of training module it is. Specific modules can also be marked as "watched" or "new", or be annotated with a checkmark to indicate that it has been completed, and additional information can optionally be provided on when the learning module was engaged with, and what course the training module is associated with. Additional verification methods can be used to confirm and track that a particular user has viewed or engaged with a training module, such as tracking that the user has scrolled through a training article, watched to the end of a video, or by providing an interactive requirement such as a quiz or button to confirm that the user has engaged and thus completed the module. Each microlearning module can also provide details regarding time required to consume the material, tags associated with each training module, topics covered, relevant compliance areas, what learning paths the module is associated with, and the title of the module. This provides a user with the amount of time required to engage with the material and complete the training module.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A method of providing real time training in software development, the method comprising:
   in a processor, storing a training database comprising a plurality of microlearning training modules, each microlearning training module comprising instruction to complete a work task and at least one contextual identifier comprising one or more keyword, code fragment, or metadata tag associated with the instruction in the microlearning training module;
   in a processor, storing user profile information for a plurality of individual users in a user profile database, the user profile information for each individual user stored in a user profile, the user profile information comprising a user training record along a learning path in a software development work environment and data on the individual user's skill proficiency across a variety of work-related skills, the user training record comprising a list of completed microlearning training modules from the training database;

in a processor, storing an electronic work task database comprising a plurality of software development work tasks, each work task comprising a technical description of the work task, a set of requirements for completing the work task, and task context comprising a natural language description of the work task, wherein each work task in the work task database is mapped to at least one microlearning training module in the training database by comparing the contextual identifiers associated with each microlearning training module to the task context for each work task using textual analysis to find similar text in a keyword database and associating one or more keywords from the keyword database with each microlearning training module from the training database;

for a software development project comprising software code, assigning one or more software development work task to a user work task list for an individual user, each work task selected from the plurality of software development work tasks in the electronic work task database, each of the assigned software development work tasks pertaining to the software code of the software development project;

in an integrated development environment with a code analysis engine, automatically matching an assigned work task to a microlearning training module by textual code analysis of the software code by the code analysis engine by scanning the software code in progress to identify a code segment that the individual user is working on that can be matched using a contextual identifier to one or more microlearning training modules in the training database;

in a processor, automatically selecting a relevant microlearning training module from the matched one or more microlearning training modules not already completed by the user by comparing it with the user training record to deliver an appropriate training module to the user based on the code segment that the user is working on and prioritizing relevant microlearning training modules that are on the user's learning path and not already completed by the user, the relevant microlearning training modules comprising instruction relevant to completion of the software development work task and recommended based on the user profile information;

in a user graphical user interface, in real time, displaying the relevant microlearning training module with the mapped work task without interrupting user workflow while completing the work task; and in a processor, upon user completion of the relevant microlearning training module, automatically updating the user training record to indicate user completion of the relevant microlearning training module and, upon completion of the work task, automatically updating the user work task list to indicate completion of the assigned work task.

2. The method of claim 1, further comprising:

generating an electronic project in the work environment comprising a plurality of work tasks required for completing the project; and automatically allocating, in an application lifecycle management (ALM) tool, one or more user work tasks to the user from the plurality of work tasks in the project, the user work tasks allocated based on the user's training record and skill proficiency.

3. The method of claim 1, further comprising selecting a training path for a user and prioritizing a plurality of microlearning training modules in the user profile for completion along the training path.

4. The method of claim 1, further comprising creating a new work task, analysing the task context of the task, and matching the new work task to at least one microlearning training module in the training database based on the task context.

5. The method of claim 1, further comprising presenting the user with additional microlearning training modules the completion of which results in a training course certification.

6. The method of claim 1, wherein each microlearning training module comprises one or more of text, slideshow, video, audio, game, puzzle, virtual reality simulation, augmented reality, mini-task, quiz, external link, and interactive media.

7. The method of claim 1, wherein the microlearning training modules are customizable for the work environment.

8. The method of claim 1, wherein each microlearning training module takes less than ten minutes to complete.

9. The method of claim 1, wherein the user is authorized to start a particular work task only after completion of a required one or more microlearning training module associated with the work task.

10. The method of claim 1, further comprising grouping multiple microlearning training modules into a training course and certifying completion of the training course when the user has completed all of the microlearning training modules in the training course.

11. The method of claim 1, wherein at least one microlearning training module has a schedule for refreshing, the method further comprising tracking a user completion date of the microlearning training module, and putting the microlearning training module on the training task list when the microlearning training module needs to be refreshed by the user.

12. The method of claim 1, further comprising classifying each user by level of expertise, recording the level of expertise of the user in the user profile, and recommending work tasks for the user based on user expertise.

13. The method of claim 1, further comprising tracking performance of a user and suggesting a microlearning training module to a user when the performance of the user would benefit from the microlearning training module.

14. The method of claim 1, wherein the user is automatically assigned to a task or excluded from executing a task based on their user profile.

15. The method of claim 1, further comprising quantifying a work product of the work task to indicate the user's skill proficiency at the work task and updating the user profile to upgrade, downgrade, or affirm the user's skill proficiency.

16. A computerized real time software development training system comprising:

one or more hardware processor;

one or more memory in the one or more hardware processor, the one or more memory comprising:

a work task database comprising a plurality of software development work tasks, each work task comprising a technical description of the work task, a set of requirements for completing the work task, and task context comprising a natural language description of the work task;

a training database comprising a plurality of microlearning training modules, each of the microlearning training modules comprising instruction relevant to completion of a work task in the work task database and contextual identifiers associated with the training module comprising one or more keyword, code fragment, or metadata tag, such that the microlearning training module can be matched to a work task in the work task database based on the contextual identifiers using textual analysis by comparing the contextual identifiers associated with each microlearning training module to the task context for each work task using textual analysis to find similar text in a keyword database and associating one or more keywords from the keyword database with each microlearning training module from the training module database;

a user profile database storing user information for a plurality of individual users in a plurality of electronic user profiles, the user information in each individual user profile comprising a individual user's training record along a learning path in a work environment comprising a list of completed microlearning training modules from the training database;

a code analysis engine with a source code editor for automatically scanning software code in progress by the user to identify a code segment that the individual user is working on that can be matched using a contextual identifier to one or more microlearning training modules in the training database by textual code analysis of the software code; and a graphical user interface displaying a work task assigned to a user selected from the task database and one or more microlearning training modules relevant to the work task automatically selected for the user in real time based on the user's training record, the automatic selection based on matching the contextual identifiers associated with the microlearning training modules to the technical description task context for each work software development work task using textual analysis and the software code.

17. The system of claim 16, wherein each microlearning training module comprises one or more of text, slideshow, video, audio, game, puzzle, virtual reality simulation, augmented reality, mini-task, quiz, external link, and interactive media.

18. A computer-readable storage medium having one or more instructions thereon for providing real time user training, the instructions when executed by a processor causing the processor to:

identify a software development work task for an individual user comprising software code, the work task comprising task context, the work task stored in an electronic work task database comprising of a set of work tasks, each work task comprising a technical description of the work task, a set of requirements for completing the work task, and task context comprising a natural language description of the work task;

match the work task to at least one microlearning training module in a training database using textual analysis, the training database comprising a plurality of microlearning training modules, each of the microlearning training modules comprising at least one contextual identifier comprising one or more of a keyword, code fragment, and metadata tag, by searching for similar text in the contextual identifiers of the microlearning training module and the task context for each work task;

with a code analysis engine, scanning software code in progress with a source code editor to identify a code segment that the individual user is working on that can be matched using a contextual identifier to one or more training modules in the training database and automatically match the work task to a training module by textual code analysis of the software code;

evaluate whether the matched training module is relevant to a particular user based on a user profile, the user profile comprising a user training record along a user learning path and data on the user's skill proficiency across a variety of work-related skills, the user training record comprising a list of completed microlearning training modules, and prioritize training modules that are on the user's learning path and not already completed by the user to deliver the most appropriate training module to the user based on the code segment that the user is working on and prioritizing relevant microlearning training modules that are on the user's learning path and not already completed by the user, the relevant microlearning training modules comprising instruction relevant to completion of the software development work task and recommended based on the user profile information;

present the work task and the one or more relevant microlearning training modules to the user in a graphical user interface in real time; and track completion of the relevant microlearning training modules by the user in the user profile.

* * * * *